United States Patent
Manolakos et al.

(10) Patent No.: US 11,424,887 B2
(45) Date of Patent: Aug. 23, 2022

(54) LOOK-AHEAD REFERENCE SIGNAL BUNDLING DETERMINATION FOR TIME-DOMAIN REFERENCE SIGNAL BUNDLING

(71) Applicant: QUALCOMM Incorporated, San Diego, CA (US)

(72) Inventors: Alexandros Manolakos, San Diego, CA (US); Gabi Sarkis, San Diego, CA (US); Wei Yang, San Diego, CA (US); Muhammad Sayed Khairy Abdelghaffar, San Jose, CA (US); Gokul Sridharan, Sunnyvale, CA (US); Joseph Binamira Soriaga, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 16/991,513

(22) Filed: Aug. 12, 2020

(65) Prior Publication Data
US 2021/0050964 A1 Feb. 18, 2021

(30) Foreign Application Priority Data
Aug. 14, 2019 (GR) .............................. 20190100355

(51) Int. Cl.
*H04L 5/00* (2006.01)
*H04W 72/04* (2009.01)

(52) U.S. Cl.
CPC ......... *H04L 5/005* (2013.01); *H04W 72/0446* (2013.01)

(58) Field of Classification Search
CPC ..... H04L 5/005; H04L 5/0044; H04L 5/0053; H04L 5/0082; H04L 5/0048; H04W 72/0446
See application file for complete search history.

(56) References Cited

U.S. PATENT DOCUMENTS

| | | | |
|---|---|---|---|
| 2011/0310831 A1* | 12/2011 | Bhattad ............... | H04B 7/0413 370/329 |
| 2015/0280876 A1* | 10/2015 | You ......................... | H04L 1/08 370/329 |
| 2019/0150029 A1* | 5/2019 | Zhang .................. | H04L 1/0027 375/260 |

OTHER PUBLICATIONS

Ericsson: "PRB Bundling for DL", 3GPP Draft, R1-1718427, PRB Bundling, 3rd Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 3, 2017 (Oct. 3, 2017), XP051353025, 3 pages, Retrieved from the Internet: URL: http://www.3gpp.org/ftp/tsg_ran/WG1_RL1/TSGR1_90b/Docs/. [retrieved on Oct. 3, 2017] the whole document.

(Continued)

*Primary Examiner* — Rina C Pancholi
(74) *Attorney, Agent, or Firm* — Qualcomm Incorporated

(57) ABSTRACT

Methods, systems, and devices for wireless communications are described. According to one or more aspects, a device, such as a user equipment (UE), may receive, from one or more base stations during a first time unit, a control signal including an indication of a reference signal bundling configuration associated with one or more physical channel types which may be potentially scheduled during a set of time units after the first time unit. The UE may determine the set of time units based on the indication of the reference signal bundling configuration. Additionally or alternatively, the UE may receive scheduling configuration of one or more physical channels, and the one or more physical channels (Continued)

during one or more second time units of the set of time units. The UE may then bundle the one or more physical channels based on the reference signal bundling configuration.

29 Claims, 22 Drawing Sheets

(56) References Cited

OTHER PUBLICATIONS

International Search Report and Written Opinion—PCT/US2020/046324—ISA/EPO—dated Nov. 10, 2020.

* cited by examiner

— Downlink Control Indicator 305

— Physical Channels 310

300

Downlink Control Indicator 405

Physical Channels 410

— Group Common Downlink Control Indicator 815

— Physical Channels 810

LOOK-AHEAD REFERENCE SIGNAL BUNDLING DETERMINATION FOR TIME-DOMAIN REFERENCE SIGNAL BUNDLING

CROSS REFERENCE

The present Applications for patent claims the benefit of Greek Provisional Patent Application No. 20190100355 by Manolakos et al., entitled "LOOK-AHEAD REFERENCE SIGNAL BUNDLING DETERMINATION FOR TIME-DOMAIN REFERENCE SIGNAL BUNDLING," filed Aug. 14, 2019, assigned to the assignee hereof, and expressly incorporated by reference in its entirety herein.

BACKGROUND

The following relates generally to wireless communications, and more specifically to look-ahead reference signal bundling determination for time-domain reference signal bundling.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

SUMMARY

The described techniques relate to improved methods, systems, devices, and apparatuses that support look-ahead reference signal bundling determination for time-domain reference signal bundling. A wireless multiple-access communications system may include a number of base stations or network access nodes, each simultaneously supporting communication for multiple communication devices, which may be otherwise known as user equipment (UE). The wireless multiple-access communications system may include a UE that supports reference signal resource bundling. In some wireless communications systems, a base station and a user equipment (UE) may transmit and receive various reference signals associated with data channel transmissions, such as demodulation reference signals. The UE may use demodulation reference signals to estimate channel characteristics of the data channel, and the UE may use the estimated channel characteristics to perform demodulation or decoding of transmissions communicated over the estimated channel. In some cases, the base station may determine a precoding (e.g., a precoder, a precoding scheme, or the like) based on its own channel estimates of reference signals received from the UE, and the base station may apply the precoding to the demodulation reference signals transmissions transmitted to the UE. The described techniques provide for a first device, such as a base station, transmitting an indication of a reference signal bundling configuration to a second device, such as a UE. Reference signal resource bundling may be used to improve transmission and reception quality through the use of coherent filtering, which may improve channel estimation. In some cases, the reference signal bundling configuration may be transmitted via control signaling, such as downlink control information from the base station to the UE. For example, one or more bits of a downlink control indicator may be used to indicate the reference signal bundling configuration. In some examples, the reference signal bundling configuration may be associated with one or more physical channel types which may be potentially scheduled during time units after a first time unit (e.g., during one or more time slots after a time slot) during which the downlink control indicator is received. The UE may then identify the time units (e.g., slots), and bundle one or more physical channels received with the plurality of time units based on the reference signal bundling configuration.

A method of wireless communication at a UE is described. The method may include receiving, from one or more base stations during a first time unit, a control signal including an indication of a reference signal bundling configuration associated with one or more physical channel types which may be potentially scheduled during a plurality of time units after the first time unit, determining the plurality of time units based on the indication of the reference signal bundling configuration, receiving scheduling configuration of one or more physical channels of the one or more physical channel types, receiving the one or more physical channels during one or more second time units of the plurality of time units, and bundling the one or more physical channels across two or more of the plurality of time units based on the reference signal bundling configuration.

An apparatus for wireless communication at a UE is described. The apparatus may include a processor, memory coupled with the processor, and instructions stored in the memory. The instructions may be executable by the processor to cause the apparatus to receive, from one or more base stations during a first time unit, a control signal including an indication of a reference signal bundling configuration associated with one or more physical channel types which may be potentially scheduled during a plurality of time units after the first time unit, determine the plurality of time units based on the indication of the reference signal bundling configuration, receive scheduling configuration of one or more physical channels of the one or more physical channel types, receive the one or more physical channels during one or more second time units of the plurality of time units, and bundle the one or more physical channels across two or more of the plurality of time units based on the reference signal bundling configuration.

Another apparatus for wireless communication at a UE is described. The apparatus may include means for receiving, from one or more base stations during a first time unit, a control signal including an indication of a reference signal bundling configuration associated with one or more physical channel types which may be potentially scheduled during a plurality of time units after the first time unit, determining the plurality of time units based on the indication of the reference signal bundling configuration, receiving scheduling configuration of one or more physical channels of the one or more physical channel types, receiving the one or more physical channels during one or more second time units of the plurality of time units, and bundling the one or more physical channels across two or more of the plurality of time units based on the reference signal bundling configuration.

A non-transitory computer-readable medium storing code for wireless communication at a UE is described. The code may include instructions executable by a processor to receive, from one or more base stations during a first time unit, a control signal including an indication of a reference signal bundling configuration associated with one or more physical channel types which may be potentially scheduled during a plurality of time units after the first time unit, determine the plurality of time units based on the indication of the reference signal bundling configuration, receive scheduling configuration of one or more physical channels of the one or more physical channel types, receive the one or more physical channels during one or more second time units of the plurality of time units, and bundle the one or more physical channels across two or more of the plurality of time units based on the reference signal bundling configuration.

In some examples of the method, apparatuses, and non-transitory computer-readable medium described herein, bundling the one or more physical channels further may include operations, features, means, or instructions for determining (e.g., assuming) that a precoding may have been applied to the one or more physical channels across the two or more of the plurality of time units based on the reference signal bundling configuration. Some examples of the method, apparatuses, and non-transitory computer-readable medium described herein may further include operations, features, means, or instructions for receiving a second physical channel during a third time unit of the plurality of time units, and determining (e.g., assuming) that the same precoding may have been applied to the second physical channel across the two or more of the plurality of time units based on the reference signal bundling configuration.

Some examples of the method, apparatuses, and non-transitory computer-readable medium described herein may further include operations, features, means, or instructions for receiving, from the one or more base stations, a radio resource control signal indicating the reference signal bundling configuration, and enabling the reference signal bundling configuration across the two or more of the plurality of time units based on the indication in the control signal and the reference signal bundling configuration. In some cases, bundling the one or more physical channels across the two or more of the plurality of time units may be based on enabling the reference signal bundling configuration.

In some examples of the method, apparatuses, and non-transitory computer-readable medium described herein, determining the plurality of time units further may include operations, features, means, or instructions for determining a first subset of the plurality of time units for receiving the one or more physical channel types based on the reference signal bundling configuration, determining a second subset of the plurality of time units for receiving the one or more physical channel types, and determining that the first subset of the plurality of time units and the second subset of the plurality of time units may be not determined (e.g., assumed) to be bundled.

In some examples of the method, apparatuses, and non-transitory computer-readable medium described herein, the first subset of the plurality of time units and the second subset of the plurality of time units include the same number of consecutive time units. Some examples of the method, apparatuses, and non-transitory computer-readable medium described herein may further include operations, features, means, or instructions for determining a number of time units remaining in a frame after receiving the control signal, and determining multiple sets of time units including the number of time units remaining in the frame, where determining the plurality of time units may be based on the multiple sets of time units.

Some examples of the method, apparatuses, and non-transitory computer-readable medium described herein may further include operations, features, means, or instructions for receiving, during a third time unit after the first time unit, a second control signal including a second indication of a second reference signal bundling configuration associated with the one or more physical channel types which may be potentially scheduled across a second plurality of time units, determining the second plurality of time units based on the second reference signal bundling configuration, and determining (e.g., assuming) a second bundling associated with the second plurality of time units based on the second reference signal bundling configuration.

Some examples of the method, apparatuses, and non-transitory computer-readable medium described herein may further include operations, features, means, or instructions for identifying, based on the reference signal bundling configuration, a number of consecutive time units directly after the first time unit, where determining the plurality of time units may be based on the number of consecutive time units. Some examples of the method, apparatuses, and non-transitory computer-readable medium described herein may further include operations, features, means, or instructions for identifying a number of offset time units based on the reference signal bundling configuration, and identifying a number of consecutive time units after the first time unit and the number of offset time units, where determining the plurality of time units may be based on the number of consecutive time units.

Some examples of the method, apparatuses, and non-transitory computer-readable medium described herein may further include operations, features, means, or instructions for identifying, based on the reference signal bundling configuration, a number of consecutive time units after a starting time unit of a frame, where determining the plurality of time units may be based on the number of consecutive time units. Some examples of the method, apparatuses, and non-transitory computer-readable medium described herein may further include operations, features, means, or instructions for identifying, based on the reference signal bundling configuration, an identifier associated with each time unit included in the plurality of time units, where determining the plurality of time units may be based on the identifier associated with each time unit.

Some examples of the method, apparatuses, and non-transitory computer-readable medium described herein may further include operations, features, means, or instructions for identifying a bit included in the control signal, the bit including the indication of the reference signal bundling configuration, where determining the plurality of time units may be based on the bit included in the control signal. Some examples of the method, apparatuses, and non-transitory computer-readable medium described herein may further include operations, features, means, or instructions for identifying a component carrier identifier based on the reference signal bundling configuration, where the control signal may be included in a first component carrier, and determining a second component carrier based on the component carrier identifier, where the plurality of time units may be included in the second component carrier.

Some examples of the method, apparatuses, and non-transitory computer-readable medium described herein may further include operations, features, means, or instructions for determining that the first time unit associated with the first component carrier overlaps with a third time unit associated with the second component carrier, where determining the plurality of time units includes determining that the plurality of time units occurs after the third time unit associated with the second component carrier based on determining that the first time unit associated with the first component carrier overlaps with the third time unit.

Some examples of the method, apparatuses, and non-transitory computer-readable medium described herein may further include operations, features, means, or instructions for identifying a number of offset time units based on the reference signal bundling configuration, and identifying a number of consecutive time units after the first time unit and the number of offset time units, where determining the plurality of time units may be based on the number of consecutive time units.

In some examples of the method, apparatuses, and non-transitory computer-readable medium described herein, the first component carrier and the second component carrier may be associated with different numerologies. Some examples of the method, apparatuses, and non-transitory computer-readable medium described herein may further include operations, features, means, or instructions for determining that the control signal may be included in a first bandwidth part, where determining the plurality of time units includes determining that the plurality of time units may be included in a second bandwidth part.

Some examples of the method, apparatuses, and non-transitory computer-readable medium described herein may further include operations, features, means, or instructions for identifying a number of offset time units based on the reference signal bundling configuration, and identifying a number of consecutive time units after the first time unit and the number of offset time units, where determining the plurality of time units may be based on the number of consecutive time units. In some examples of the method, apparatuses, and non-transitory computer-readable medium described herein, the first bandwidth part and the second bandwidth part may be associated with different numerologies.

Some examples of the method, apparatuses, and non-transitory computer-readable medium described herein may further include operations, features, means, or instructions for receiving, from the one or more base stations during a third time unit after the first time unit, a second control signal, where the control signal may be associated with multiple UEs, and where receiving the one or more physical channels may be based on the second control signal. Some examples of the method, apparatuses, and non-transitory computer-readable medium described herein may further include operations, features, means, or instructions for identifying that a field of a plurality of fields may be included in the control signal, where the field may be associated with the UE and includes the reference signal bundling configuration, where determining the plurality of time units may be based on identifying the field.

Some examples of the method, apparatuses, and non-transitory computer-readable medium described herein may further include operations, features, means, or instructions for receiving, from the one or more base stations during a fourth time unit after the first time unit, a third control signal, receiving a second physical channel during the fourth time unit based on the second control signal, and bundling the one or more physical channels and the second physical channel across the two or more of the plurality of time units based on the reference signal bundling configuration.

In some examples of the method, apparatuses, and non-transitory computer-readable medium described herein, the third time unit may be separate from the plurality of time units and the fourth time unit may be included in the plurality of time units. In some examples of the method, apparatuses, and non-transitory computer-readable medium described herein, the control signal associated with multiple UEs includes a group common downlink control indicator.

Some examples of the method, apparatuses, and non-transitory computer-readable medium described herein may further include operations, features, means, or instructions for receiving, from the one or more base stations during a third time unit after the first time unit, a second control signal, and determining a second plurality of time units based on the second control signal, where the plurality of time units overlap with the second plurality of time units.

Some examples of the method, apparatuses, and non-transitory computer-readable medium described herein may further include operations, features, means, or instructions for receiving, from the one or more base stations, a radio resource control signal indicating a second reference signal bundling configuration associated with a downlink semi-persistent scheduling during a set of time units, and enabling the second reference signal bundling configuration across the set of time units based on the second reference signal bundling configuration.

In some examples of the method, apparatuses, and non-transitory computer-readable medium described herein, a periodicity associated with the downlink semi-persistent scheduling may be less than a threshold value. In some examples of the method, apparatuses, and non-transitory computer-readable medium described herein, the second reference signal bundling configuration includes bundling configuration for reference signals associated with one or more semi-persistent scheduling configurations on a cell.

In some examples of the method, apparatuses, and non-transitory computer-readable medium described herein, the one or more semi-persistent scheduling configurations may be based on one or more of a resource block allocation, a rank, or a modulation and coding scheme. In some examples of the method, apparatuses, and non-transitory computer-readable medium described herein, the second reference signal bundling configuration configures the UE to refrain from bundling a reference signal associated with a semi-persistent scheduling with a reference signal associated with a non-semi-persistent scheduling.

In some examples of the method, apparatuses, and non-transitory computer-readable medium described herein, the one or more physical channel types include one or more of a physical downlink shared channel, a demodulation reference signal, a cell-specific reference signal, a channel state information reference signal, a physical downlink control channel, or a positioning reference signal. In some examples of the method, apparatuses, and non-transitory computer-readable medium described herein, the plurality of time units includes a plurality of slots. In some examples of the method, apparatuses, and non-transitory computer-readable medium described herein, the control signal includes a downlink control indicator.

A method of wireless communication at a base station is described. The method may include determining a reference signal bundling configuration associated with one or more physical channel types which may be potentially scheduled during a plurality of time units after a first time unit, transmitting, to a UE during the first time unit, a control signal including an indication of the reference signal bundling configuration, transmitting, to the UE, scheduling configuration of one or more physical channels of the one or more physical channel types, and transmitting the one or more physical channels during one or more second time units of the plurality of time units, where the one or more physical channels is bundled across two or more of the plurality of time units based on the reference signal bundling configuration.

An apparatus for wireless communication at a base station is described. The apparatus may include a processor, memory coupled with the processor, and instructions stored in the memory. The instructions may be executable by the processor to cause the apparatus to determine a reference signal bundling configuration associated with one or more physical channel types which may be potentially scheduled during a plurality of time units after a first time unit, transmit, to a UE during the first time unit, a control signal including an indication of the reference signal bundling configuration, transmit, to the UE, scheduling configuration of one or more physical channels of the one or more physical channel types, and transmit the one or more physical channels during one or more second time units of the plurality of time units, where the one or more physical channels is bundled across two or more of the plurality of time units based on the reference signal bundling configuration.

Another apparatus for wireless communication at a base station is described. The apparatus may include means for determining a reference signal bundling configuration associated with one or more physical channel types which may be potentially scheduled during a plurality of time units after a first time unit, transmitting, to a UE during the first time unit, a control signal including an indication of the reference signal bundling configuration, transmitting, to the UE, scheduling configuration of one or more physical channels of the one or more physical channel types, and transmitting the one or more physical channels during one or more second time units of the plurality of time units, where the one or more physical channels is bundled across two or more of the plurality of time units based on the reference signal bundling configuration.

A non-transitory computer-readable medium storing code for wireless communication at a base station is described. The code may include instructions executable by a processor to determine a reference signal bundling configuration associated with one or more physical channel types which may be potentially scheduled during a plurality of time units after a first time unit, transmit, to a UE during the first time unit, a control signal including an indication of the reference signal bundling configuration, transmit, to the UE, scheduling configuration of one or more physical channels of the one or more physical channel types, and transmit the one or more physical channels during one or more second time units of the plurality of time units, where the one or more physical channels is bundled across two or more of the plurality of time units based on the reference signal bundling configuration.

Some examples of the method, apparatuses, and non-transitory computer-readable medium described herein may further include operations, features, means, or instructions for configuring the UE to determine (e.g., assume) a pre-coding has been applied to the one or more physical channels across the two or more of the plurality of time units based on the reference signal bundling configuration.

Some examples of the method, apparatuses, and non-transitory computer-readable medium described herein may further include operations, features, means, or instructions for transmitting a second physical channel during a third time unit of the plurality of time units, and configuring the UE to determine (e.g., assume) the same precoding has been applied to the second physical channel across the two or more of the plurality of time units based on the reference signal bundling configuration.

Some examples of the method, apparatuses, and non-transitory computer-readable medium described herein may further include operations, features, means, or instructions for transmitting, to the UE, a radio resource control signal indicating the reference signal bundling configuration, and configuring the UE to enable the reference signal bundling configuration across the two or more of the plurality of time units based on the indication in the control signal and the reference signal bundling configuration, where bundling the one or more physical channels across the two or more of the plurality of time units may be based on enabling the reference signal bundling configuration.

Some examples of the method, apparatuses, and non-transitory computer-readable medium described herein may further include operations, features, means, or instructions for determining a first subset of the plurality of time units for transmitting the one or more physical channels based on the reference signal bundling configuration, determining a second subset of the plurality of time units for transmitting the one or more physical channels, and determining that the first subset of the plurality of time units and the second subset of the plurality of time units may be not determined (e.g., assumed) to be bundled. In some examples of the method, apparatuses, and non-transitory computer-readable medium described herein, the first subset of the plurality of time units and the second subset of the plurality of time units include the same number of consecutive time units.

Some examples of the method, apparatuses, and non-transitory computer-readable medium described herein may further include operations, features, means, or instructions for transmitting, during a third time unit after the first time unit, a second control signal including a second indication of a second reference signal bundling configuration associated with the one or more physical channel types which may be potentially scheduled across a second plurality of time units. Some examples of the method, apparatuses, and non-transitory computer-readable medium described herein may further include operations, features, means, or instructions for including, in the reference signal bundling configuration, a number of consecutive time units directly after the first time unit, where the plurality of time units may be included in the number of consecutive time units.

Some examples of the method, apparatuses, and non-transitory computer-readable medium described herein may further include operations, features, means, or instructions for including, in the reference signal bundling configuration, a number of offset time units, where the plurality of time units may be included in a number of consecutive time units after the first time unit and the number of offset time units.

Some examples of the method, apparatuses, and non-transitory computer-readable medium described herein may further include operations, features, means, or instructions for including, in the reference signal bundling configuration, a number of consecutive time units after a starting time unit of a frame, where the plurality of time units may be included in the number of consecutive time units. Some examples of the method, apparatuses, and non-transitory computer-readable medium described herein may further include operations, features, means, or instructions for including, in the reference signal bundling configuration, an identifier associated with each time unit included in the plurality of time units.

Some examples of the method, apparatuses, and non-transitory computer-readable medium described herein may further include operations, features, means, or instructions for including a bit in the control signal, the bit including the indication of the reference signal bundling configuration. Some examples of the method, apparatuses, and non-transitory computer-readable medium described herein may further include operations, features, means, or instructions for identifying a component carrier identifier based on the reference signal bundling configuration, where the control signal may be included in a first component carrier, and determining a second component carrier based on the component carrier identifier, where the plurality of time units may be included in the second component carrier.

In some examples of the method, apparatuses, and non-transitory computer-readable medium described herein, the first component carrier and the second component carrier may be associated with different numerologies. In some examples of the method, apparatuses, and non-transitory computer-readable medium described herein, transmitting the control signal further may include operations, features, means, or instructions for transmitting the control signal in a first bandwidth part, where the plurality of time units may be included in a second bandwidth part. In some examples of the method, apparatuses, and non-transitory computer-readable medium described herein, the first bandwidth part and the second bandwidth part may be associated with different numerologies.

Some examples of the method, apparatuses, and non-transitory computer-readable medium described herein may further include operations, features, means, or instructions for determining that the control signal may be associated with multiple UEs, the multiple UEs including the UE, and transmitting, to the UE during a third time unit after the first time unit, a second control signal, where transmitting the one or more physical channels may be based on the second control signal.

Some examples of the method, apparatuses, and non-transitory computer-readable medium described herein may further include operations, features, means, or instructions for determining a plurality of fields included in the control signal, where each field of the plurality of fields may be associated with the UE of the multiple UEs. Some examples of the method, apparatuses, and non-transitory computer-readable medium described herein may further include operations, features, means, or instructions for transmitting, to the UE during a fourth time unit after the first time unit, a third control signal, and transmitting a second physical channel during the fourth time unit based on the second control signal, where the one or more physical channels and the second physical channel may be bundled across the two or more of the plurality of time units based on the reference signal bundling configuration.

In some examples of the method, apparatuses, and non-transitory computer-readable medium described herein, the third time unit may be separate from the plurality of time units and the fourth time unit may be included in the plurality of time units. In some examples of the method, apparatuses, and non-transitory computer-readable medium described herein, the control signal associated with multiple UEs includes a group common downlink control indicator.

Some examples of the method, apparatuses, and non-transitory computer-readable medium described herein may further include operations, features, means, or instructions for transmitting, to the UE during a third time unit after the first time unit, a second control signal, where the second control signal may be associated with a second plurality of time units, and where the plurality of time units overlap with the second plurality of time units.

Some examples of the method, apparatuses, and non-transitory computer-readable medium described herein may further include operations, features, means, or instructions for transmitting, to the UE, a radio resource control signal indicating a second reference signal bundling configuration associated with a downlink semi-persistent scheduling during a set of time units, and configuring the UE to enable the second reference signal bundling configuration across the set of time units based on the second reference signal bundling configuration.

In some examples of the method, apparatuses, and non-transitory computer-readable medium described herein, a periodicity associated with the downlink semi-persistent scheduling may be less than a threshold value. In some examples of the method, apparatuses, and non-transitory computer-readable medium described herein, the second reference signal bundling configuration includes bundling configuration for reference signals associated with one or more semi-persistent scheduling configurations on a cell.

In some examples of the method, apparatuses, and non-transitory computer-readable medium described herein, the one or more semi-persistent scheduling configurations may be based on one or more of a resource block allocation, a rank, or a modulation and coding scheme. In some examples of the method, apparatuses, and non-transitory computer-readable medium described herein, the second reference signal bundling configuration configures the UE to refrain from bundling a reference signal associated with a semi-persistent scheduling with a reference signal associated with a non-semi-persistent scheduling.

In some examples of the method, apparatuses, and non-transitory computer-readable medium described herein, the one or more physical channel types include one or more of a physical downlink shared channel, a demodulation reference signal, a cell-specific reference signal, a channel state information reference signal, a physical downlink control channel, or a positioning reference signal. In some examples of the method, apparatuses, and non-transitory computer-readable medium described herein, the plurality of time units includes a plurality of slots. In some examples of the method, apparatuses, and non-transitory computer-readable medium described herein, the control signal includes a downlink control indicator.

DETAILED DESCRIPTION

Figure 1:
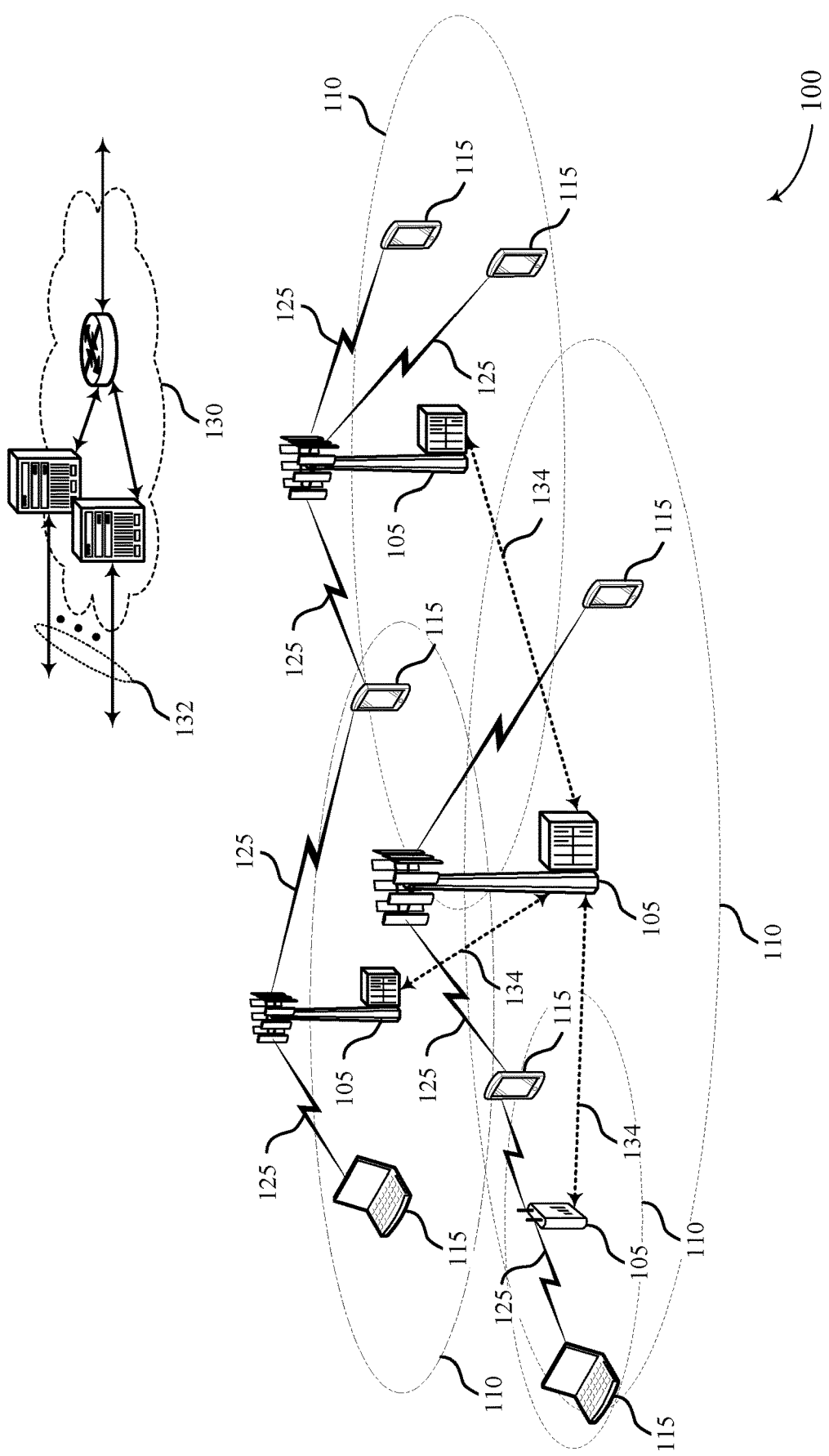
FIG. 1 illustrates an example of a wireless communications system that supports look-ahead reference signal bundling determination for time-domain reference signal bundling in accordance with aspects of the present disclosure.

In some wireless communications systems, a base station and a user equipment (UE) may transmit and receive various reference signals associated with data transmissions, such as demodulation reference signals. A demodulation reference signal may include, for example, a reference signal communicated with a data transmission (e.g., downlink, uplink, sidelink). A demodulation reference signal may be communicated using a demodulation reference signal pattern, where the demodulation reference signal pattern may include a plurality of parameters defining: a resource allocation of time, frequency, or spectral resources for the demodulation reference signals; a multiplexing scheme or an antenna port mapping for the demodulation reference signals in the frequency, time, and code domain; or a scrambling code to be applied to the demodulation reference signals, among other examples. The UE may use demodulation reference signals to estimate channel characteristics (e.g., via channel quality measurements) of the channel or channels on which the base station and the UE communicate data. The UE may use the estimated channel characteristics to perform demodulation or decoding of transmissions communicated over the estimated channel.

Other wireless communications systems do not provide for upcoming demodulation reference signal bundling indication and instead focus on comparing previous information to determine whether to bundle reference signals (such as, demodulation reference signal). However, such techniques produce errors based incorrect or incomplete information being received, which leads to flawed information being compared and influencing a wrong determination or outcome.

One or more aspects of the present disclosure provide for a control signal including information related to reference signal bundling of potential data receptions, which may be potentially scheduled, for a plurality of upcoming slots. In some examples, a UE may receive a control signal (e.g., downlink control indicator) including an indication of a reference signal bundling configuration. The reference signal bundling configuration may be associated with one or more physical channel types which may be potentially scheduled (e.g., during a plurality of time slots after the time slot during which the control signal is received). Aspects of the present disclosure provide for introducing mechanisms for a base station to indicate a time period to a UE. In some cases, the UE will be able to determine a plurality of time slots to be bundled together based on the indication of the reference signal bundling configuration. For example, upon receiving the indication of the reference signal bundling configuration, the UE may be configured such that all the physical channel types received within the determined plurality of time periods (e.g., slots) may be associated with the same precoder (e.g., may be bundled). In some instances, the UE may determine (e.g., assume) that any of the physical channels received in the bundled time units may be used to infer the channel of any other physical channel received inside the same bundled time units. Additionally or alternatively, the UE may receive one or more physical channels during the determined plurality of time periods, and may bundle the one or more physical channels.

Aspects of the disclosure are initially described in the context of a wireless communications system. Additionally, aspects of the disclosure are illustrated through additional wireless communications systems, timelines, resource configurations, and process flows. Aspects of the disclosure are further illustrated by and described with reference to apparatus diagrams, system diagrams, and flowcharts that relate to look-ahead reference signal bundling determination for time-domain reference signal bundling.

FIG. 1 illustrates an example of a wireless communications system 100 that supports look-ahead reference signal bundling determination for time-domain reference signal bundling in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

The Base stations 105 may wirelessly communicate with the UEs 115 via one or more base station antennas. The base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some examples, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a defined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Some wireless communications systems may not provide for upcoming demodulation reference signal bundling indication and may instead focus on comparing previous information to determine whether to bundle reference signals. That is, other wireless communications systems may not provide for forward-looking demodulation reference signal bundling indication. Instead, comparing previous information to determine whether to bundle may produce errors based on incorrect or incomplete information being received, which may lead to flawed information being compared and may lead to a wrong determination or outcome.

One or more aspects of the present disclosure provide for UEs 115 to receive, from a base station 105 during a first time slot, a control signal including an indication of a reference signal bundling configuration. In some cases, the control signal may include a downlink control indicator. In some cases, the reference signal bundling configuration may be associated with one or more physical channel types which may be potentially scheduled during a plurality of time slots after the first time slot. Upon receiving the indication of the reference signal bundling configuration, the UE 115 may determine the plurality of time slots based on the indication of the reference signal bundling configuration. The UE 115 may then receive a scheduling configuration of one or more physical channels of the one or more physical channel types, and the one or more physical channels. In some cases, the UE 115 may receive the one or more physical channels during one or more second time slots of the plurality of time slots. In some cases, the UE 115 may determine that the one or more physical channels are included in the plurality of time slots. In some implementations, the UE 115 may bundle the one or more physical channels across two or more of the plurality of time slots based on the reference signal bundling configuration.

Figure 2:
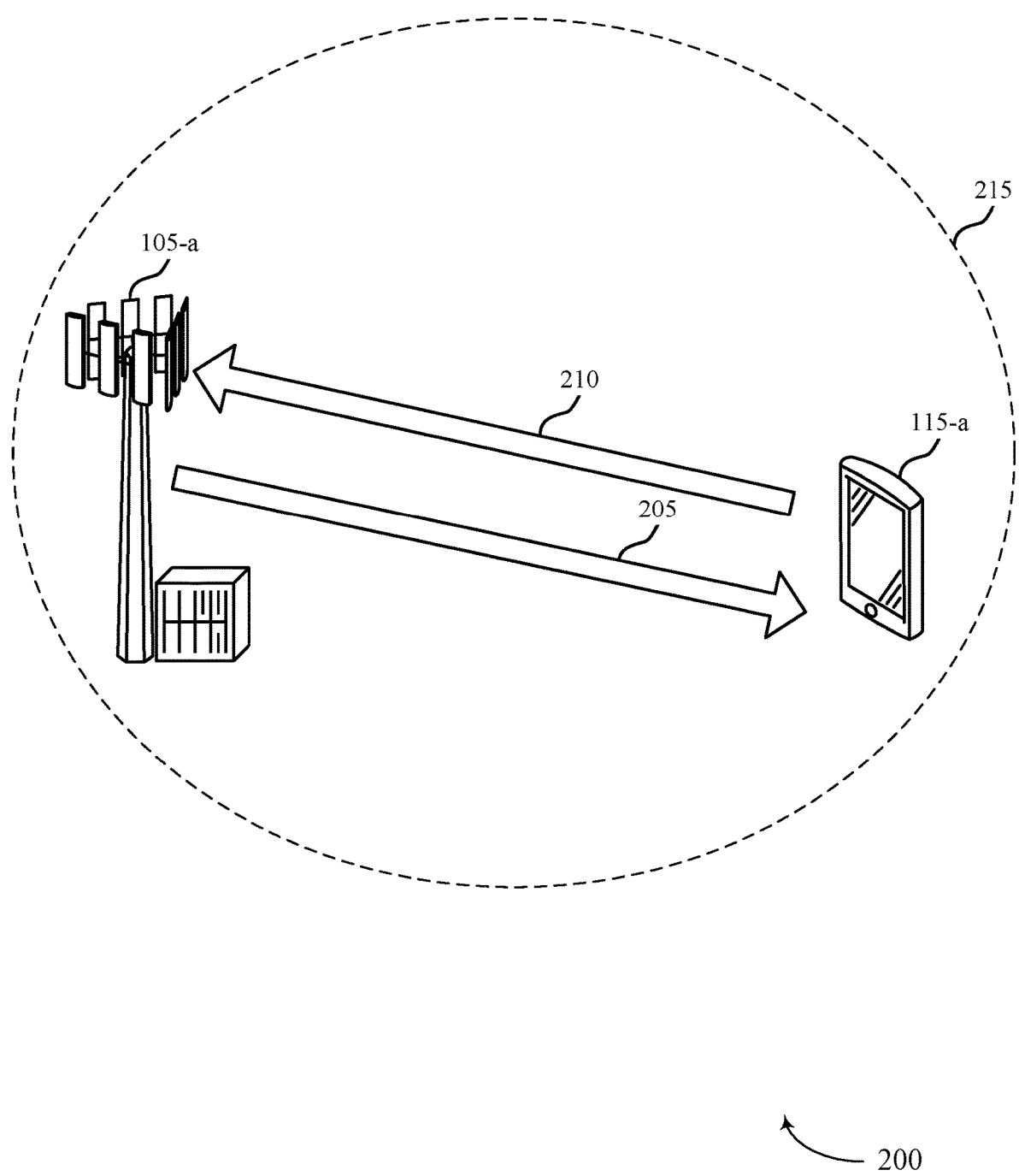
FIG. 2 illustrates an example of a wireless communications system that supports look-ahead reference signal bundling determination for time-domain reference signal bundling in accordance with aspects of the present disclosure.

FIG. 2 illustrates an example of a wireless communications system 200 that supports look-ahead reference signal bundling determination for time-domain reference signal bundling in accordance with aspects of the present disclosure. In some examples, the wireless communications system 200 may implement aspects of the wireless communications system 100. Wireless communications system 200 may include a base station 105-*a* and a UE 115-*a*, which may be examples of corresponding base stations 105 and UEs 115, respectively, as described herein with reference to FIG. 1.

Base station 105-*a* and UE 115-*a* may operate within geographical area 215. Base station 105-*a* may transmit downlink messages to UE 115-*a* on resources of a carrier 205, and UE 115-*a* may transmit uplink messages to base station 105-*a* on resources of a carrier 210. In some cases, carriers 205 and 210 may be a same carrier or may be separate carriers. Exemplary downlink data transmissions are shown in detail with reference to FIGS. 3 through 9.

As described herein, UE 115-*a* may determine whether to bundle, which may refer to time domain bundling, the reference signals (e.g., demodulation reference signal) of a downlink transmission. Bundling may refer to a receiver (e.g., a UE such as UE 115-*a*) determining (e.g., assuming) a same precoder has been applied across multiple data transmissions or data channels of different scheduling units (e.g., a first physical downlink shared channel transmission and the following physical downlink shared channel transmission) including the demodulation reference signal associated with each downlink data transmission on the data channel, and a transmitter (e.g., a base station such as base station 105-*a*) coherently transmitting reference signals (e.g., demodulation reference signal) associated with the data channels over different time examples (e.g., time units, slots, or mini-slots) on an antenna port. According to one or more aspects of the present disclosure, an antenna port may be defined such that the channel over which a symbol on the antenna port is conveyed can be inferred from the channel over which another symbol on the same antenna port is conveyed. In some examples, for demodulation reference signals associated with a physical downlink shared channel, the receiver may be configured to infer the channel over which a physical downlink shared channel symbol on one antenna port is conveyed from the channel over which a demodulation reference signals symbol on the same antenna port is conveyed. In some examples, the receiver may determine (e.g., assume) that the two symbols are within the same resource as the scheduled physical downlink shared channel, in the same slot, and in the same physical resource group.

Additionally, the receiver may jointly process and/or coherently filter the different reference signals received with each data channel to improve channel estimation. Bundling may occur over time or across frequencies or both. In some examples, time domain bundling may refer to the receiver determining (e.g., assuming) that the same precoder is used across the data channels of different scheduling units. Also, the receiver (e.g., UE 115-*a*) may determine (e.g., assume) that demodulation reference signal is coherently transmitted over different time instants, at the receiver.

In some wireless communications systems, a UE may determine new data transmission in downlink for the given HARQ process if a new data indicator (NDI) bit is toggled (e.g., the NDI bit is different than the one sent in a previous transmission). Additionally, the UE may bundle the demodulation reference signal of one or more received data transmissions (e.g., two subsequent downlink data transmissions) from a base station based on a new bundling indicator (NBI). That is, a UE may determine whether to bundle the reference signals (e.g., demodulation reference signal) of a resource block using an indication, such as an NBI, from the base station. When the UE performs demodulation reference signal bundling, the base station may configure parameters that are common across a bundle of time resources (e.g., transmission time intervals), such as a common precoding (e.g., a precoder, a precoding scheme, or the like), to coherently transmit the demodulation reference signals in each of the transmission time intervals of each respective bundle on an antenna port. The NBI may be transmitted via control signaling (e.g., via a downlink control indicator) to the UE. For instance, a single bit of the downlink control indicator may be used for the NBI, which may dynamically indicate whether the current or most recent precoding for the current or most recent demodulation reference signal is the same as a previous precoding for demodulation reference signal.

In some cases, if the NBI bit is 0 in a grant, then the UE may determine (e.g., assume) that the given physical downlink shared channel transmission is not bundled with the previous physical downlink shared channel transmission. Additionally, if the NBI bit is 1 in a grant, then the UE may determine (e.g., assume) that the given physical downlink shared channel transmission is bundled with the previous physical downlink shared channel transmission. Some techniques may be deficient if a physical downlink shared channel transmission including the indication of a new bundle, is lost. In some such cases, the UE may continue to determine (e.g., assume) that the given physical downlink shared channel transmission is bundled with the previous physical downlink shared channel transmission. In some cases, if the NBI bit is toggled in a grant (e.g., if the NBI bit different than the one sent in a previous physical downlink shared channel transmission), then the UE may determine (e.g., assume) that a new precoder is used in downlink for the given physical downlink shared channel transmission. Some techniques may be deficient if a physical downlink shared channel transmission including the toggling bit is lost. In some such cases, the UE may continue to assume the previous precoder for physical downlink shared channel transmissions associated with a new precoder.

In some cases, if the base station explicitly signals that 2 physical downlink shared channels are bundled, then it may be likely that some similarities between the two grants exist. For instance, if two physical downlink shared channels are bundled, then the same port identifiers are used in the previous physical downlink shared channel and the new physical downlink shared channel. Additionally, both physical downlink shared channels may be of the same type (e.g., Type A or Type B). In some examples, if two physical downlink shared channels are bundled, then the previous physical downlink shared channel and the new physical downlink shared channel may have the same demodulation reference signal pattern with respect to the actual location of demodulation reference signal symbols within the physical downlink shared channels. In some cases, both grants may have the same frequency domain assignment, the same frequency domain assignment type (e.g., Type 0 or Type 1), the same physical resource groups, or a combination thereof. In some examples, a second physical downlink shared channel may have at least as large a physical resource group as a previous physical downlink shared channel. Additionally or alternatively, if two physical downlink shared channels are bundled, then a number of layers of both physical downlink shared channels for the two grants may be the same, a demodulation reference signal sequence initialization for the two grants may be the same, a transmission configuration indication state indication for the two grants may be the same, and a time-domain distance between the first symbol of the physical downlink shared channels within some symbols or slots for the two grant may be equal.

In some wireless communications systems, the UE may implicitly determine (e.g., no explicit downlink control indicator bit is included in the downlink control indicators) whether the precoding (e.g., the precoder, the precoding scheme, or the like) is the same in a new physical downlink shared channel and a previous physical downlink shared channel reception if a combination of one or more fields (e.g., the fields described herein) in the two corresponding downlink control indicators has the same values. Alternatively, the UE may determine (e.g., assume) that the precoding between the two physical downlink shared channel is different. In some other different wireless communications systems, the base station may not be able to schedule (e.g., when one or more fields are the same) without signaling that bundling is enabled. Some wireless communications systems do not support explicit signaling in the downlink control indicator (e.g., may not support signaling that disables the bundling). In such cases, the base station may change one of the values of the one or more fields (e.g., scheduling parameters) to implicitly disable the bundling.

Some other wireless communications systems may support three different group common downlink control indicator formats. In some examples, the group common downlink control indicators may include downlink control indicator formats that are intended to be received by multiple UEs, and contained in a sequence information intended for each UE separately. Examples of such downlink control indicator formats may include downlink control indicator for slot format indication (SFI), downlink control indicator for downlink puncturing or preemption, and downlink control indicator for transmit power control commands. Some wireless communications systems may not provide for upcoming demodulation reference signal bundling indication and instead focus on comparing previous information to determine whether to bundle (e.g., backward looking) reference signals. However, this prior method breaks down if the information previously received is inaccurate or incomplete, and this inaccurate or incomplete information may indicate to bundle incorrectly or may not indicate to bundle when the device should bundle.

One or more aspects of the present disclosure provide for a downlink control indicator including information related to reference signal bundling of potential data receptions for a plurality of slots in the future. That is, aspects of the present disclosure provide for introducing mechanisms for the base station 105-*a* to indicate a bundle period to a UE 115-*a*. In some cases, the UE 115-*a* may receive, during a first time slot, a control signal including an indication of a reference signal bundling configuration associated with one or more physical channel types which may be potentially scheduled during a plurality of time units after the first time unit. The UE 115-*a* may then determine a bundle period of time (e.g., time slots which are bundled together). For example, upon receiving the indication of the reference signal bundling configuration, the UE 115-*a* may determine (e.g., assume) that all the physical channel types received within the determined bundle period of time (e.g., two or more slots) are associated with the same precoder (e.g., can be bundled). In some instances, the UE 115-*a* may determine (e.g., assume) that any of the physical channels received in the bundle period of time may be used to infer the channel of any other physical channel received inside the bundle period of time.

In some instances, for demodulation reference signals associated with a physical downlink shared channel, the UE 115-*a* may infer the channel over which a physical downlink shared channel symbol on one antenna port is conveyed from the channel over which a demodulation reference signals symbol on the same antenna port is conveyed. In some cases, the UE 115-*a* may determine (e.g., assume) that the physical downlink shared channel symbol and the demodulation reference signal symbol are within the same resource as the scheduled physical downlink shared channel symbol. In some cases, the UE 115-*a* may determine (e.g., assume) that the physical downlink shared channel symbol and the demodulation reference signal symbol are within the bundled time units. Additionally, the one or more aspects of the present disclosure provide for configuring the UE 115-*a* to receive the reference signal bundling configuration using radio resource control signaling. The UE 115-*a* may receive, from the base station 105-*a*, a radio resource control signal indicating the reference signal bundling configuration. The UE 115-*a* may then receive an indicator of the reference signal bundling configuration in a control signal (such as a downlink control signal), and may enable the reference signal bundling configuration across the bundle period of time (or, e.g., multiple bundle periods of time) based on the indication in the control signal and the reference signal bundling configuration received in the radio resource control signal.

Figure 3:
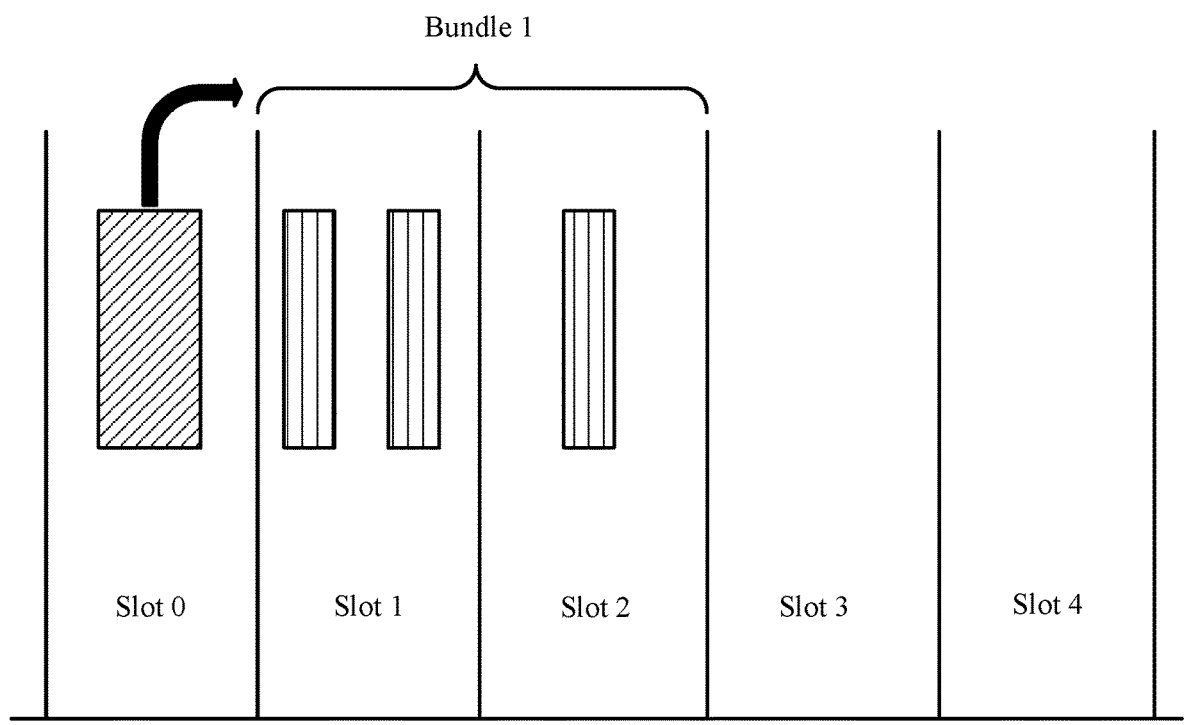
FIG. 3 illustrates an example of a timeline that supports look-ahead reference signal bundling determination for time-domain reference signal bundling in accordance with aspects of the present disclosure.
Figure 3:
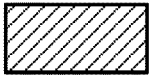
Figure 3:

FIG. 3 illustrates an example of a timeline 300 that supports look-ahead reference signal bundling determination for time-domain reference signal bundling in accordance with aspects of the present disclosure. In some examples, the timeline 300 may implement aspects of the wireless communications system 100 as described with reference to FIG. 1 and the wireless communications system 200 as described with reference to FIG. 2. The timeline 300 illustrates procedures for upcoming reference signal bundling determination in multiple time units (such as slots) to facilitate time-domain reference signal bundling for physical channels communicated between one or more base stations and a UE, which may be examples of the corresponding devices as described with reference to FIG. 1.

The timeline 300 shows a series of multiple time units (e.g., slot 0, slot 1, slot 2, slot 3, and slot 4). Although depicted as slots in the example of FIG. 3, it may be understood that the time units may include, for example, any type of scheduling units for wireless communications, such as slots, mini-slots, a combination of slots and mini-slots, frames, subframes, symbol groups, and the like. The example timeline 300 of FIG. 3 shows 5 time units, but it is to be understood that the techniques described herein may be similarly applied across any greater or lesser number of time units. The base station and the UE may communicate uplink and downlink transmissions during each of the multiple time units. For example, during one or more of the time units, the base station may transmit control signaling (via, e.g., downlink control indictor, radio resource control signaling, etc.) and downlink data transmissions (e.g., in a physical downlink shared channel) to the UE. In some cases, the time units of the timeline 300 may include one or more resource blocks.

In some cases, during one or more of the time units (e.g., slot 0, slot 1, slot 2, slot 3, and slot 4), the base station may transmit to the UE control signals and/or physical channel transmissions. In some cases, the base station may communicate the one or more physical channels according to a precoding (e.g., a precoder, a precoding scheme, or the like). The UE may receive a control signal during a first time unit. As depicted in the example of FIG. 3, the UE may receive a control signal (e.g., downlink control indicator 305) during slot 0 of the timeline 300. The control signal (e.g., downlink control indicator 305) may include an indication of a reference signal bundling configuration associated with one or more physical channel types which may be potentially scheduled during a plurality of time units (such as slot 1, slot 2, slot 3, and slot 4) after slot 0 of the timeline 300. That is, the downlink control indicator 305 may provide information related to reference signal bundling of potential data receptions for a plurality of slots in the future. The information related to reference signal bundling may be independent of whether or not the UE would actually be scheduled during the future time units (such as slot 1, slot 2, slot 3, and slot 4) after slot 0. According to some examples, the indication of the reference signal bundling configuration may be referred to as a look-ahead dynamic reference signal bundling indication. In one example, the base station may use the indication of the reference signal bundling configuration to configure the UE to determine (e.g., assume) that the same precoding has been applied (e.g., by one or more base stations which may include the configuring base station or other base stations in the wireless communication system, or both) for the physical channel types which are scheduled during the future time units (such as slot 1, slot 2, slot 3, and slot 4). In some examples, the UE may receive information associated with the reference signal bundling configuration using a radio resource control signal. The UE may then enable the reference signal bundling configuration upon receiving a control signal (such as, the downlink control indicator 305 in slot 0).

Upon receiving the indication of the reference signal bundling configuration, the UE may determine a plurality of time units (e.g., the plurality of time units bundled together) based on the reference signal bundling configuration. In some examples, the UE may receive the downlink control indicator 305 and determine that the reference signal bundling configuration indicates that any transmissions in "X" number of consecutive slots within a period after receiving the downlink control indicator 305, will be bundled together (e.g., using demodulation reference signal bundling). In some examples, the UE may determine that any transmissions in "X" number of consecutive slots within a period from the frame boundary, will be bundled together. In one example, if X=2, and the UE receives transmissions in two non-adjacent slots (e.g., with one gap slot in between), then the UE may determine (e.g., assume) that the reference signals associated with the transmissions are not bundled. Additionally or alternatively, the UE may determine an identifier associated with each time unit included in the plurality of time units (e.g., the plurality of time units that are bundled together). In some examples, the UE may determine the identifier based on the reference signal bundling configuration. According to some examples, the control signal (e.g., downlink control indicator 305) may indicate that transmissions in specific slots will be bundled together. As depicted herein, the downlink control indicator 305 may indicate that slot 1 and slot 2 are bundled.

In some examples, the base station may indicate the reference signal bundling configuration using a bit included in the control signal (e.g., downlink control indicator 305). For example, if the field in the downlink control indicator 305 includes 1 bit, then the UE may be configured to determine (e.g., assume) bundling of upcoming time slots if the field is of a first value (such as 1). Further the UE may be configured to determine (e.g., assume) that there is no upcoming bundling if the field of the downlink control indicator 305 is of a second value (such as 0). Additionally or alternatively, if the field in the downlink control indicator 305 includes multiple bits, then the UE may be configured to determine (e.g., assume) a first type of bundling of upcoming time slots (e.g., every 2 slots is bundled) if the field is of a first value (such as 00). Similarly, the UE may be configured to determine (e.g., assume) a second type of bundling of upcoming time slots (e.g., every 4 slots is bundled) if the field is of a second value (such as 01, 10, 11, etc.).

In some cases, the control signal (e.g., downlink control indicator 305) may include information that a number of slots (e.g., 2 slots) following the control signal receiving slot (e.g., slot 0), are bundled. In the example of FIG. 3, the UE may determine that the two slots following slot 0 are slot 1 and slot 2. That is, the UE may determine that slot 1 and slot 2 are bundled together. In some examples, the UE may receive a scheduling configuration (not shown) of one or more physical channels of the one or more physical channel types. The UE may then receive the one or more physical channels during one or more second time units of the plurality of time units. In some cases, the UE may determine (e.g., assume) that any of the physical channels received in slot 1 and slot 2 may be used to infer the channel of any other physical channel received inside slot 1 and slot 2.

In the example of FIG. 3, the UE may receive a first physical channel 310 during slot 1 of the timeline 300, a second physical channel 310 during slot 1 of the timeline 300, and a third physical channel 310 during slot 2 of the timeline 300. In some examples, the UE may bundle the first physical channel 310, the second physical channel 310, and the third physical channel 310. In some examples, the UE may determine whether the physical channels (e.g., the first physical channel 310, the second physical channel 310, and the third physical channel 310) are received within the plurality of time units indicated in the control signal (e.g., downlink control indicator 305). Following the previous example, the UE may determine whether the physical channels are received within 2 slots following slot 0 (e.g., within slot 1 and slot 2). Upon determining that the first physical channel 310, the second physical channel 310, and the third physical channel 310 are received within slot 1 and slot 2, the UE may bundle the first physical channel 310, the second physical channel 310, and the third physical channel 310. In some examples, the UE may determine (e.g., assume) that the base station may apply the same precoding (e.g., the same precoder, the same precoding scheme, or the like) to the first physical channel 310, the second physical channel 310, and the third physical channel 310.

Although not depicted herein, the base station may configure the UE with an offset (e.g., a delay) to be applied before a reference time at which the UE may begin bundling the time units. The offset may define a duration of time for the UE to wait before applying the start of the bundling. The base station may configure the offset, for example, as a number of slots and/or a number of symbols within a transmission time interval. In some cases, the offset may be defined with reference to the slot within which the control signal is received (e.g., downlink control indicator 305). In some examples, the UE may determine the reference time based on the offset (e.g., the reference time would be at the point in time at the end of the duration of the offset, when the UE begins bundling). Alternatively, the offset may be defined with reference to a beginning of a frame.

According to one or more aspects of the present disclosure, the UE may receive a radio resource control signal indicating a second reference signal bundling configuration associated with a downlink semi-persistent scheduling during a set of time units. For example, the UE may receive the second reference signal bundling configuration from the base station. In some examples, the UE may enable the second reference signal bundling configuration across the set of time units based on the second reference signal bundling configuration. That is, the radio resource control signal may indicate whether the reference signal bundling for semi-persistent scheduling is enabled for the UE. In some examples, the second reference signal bundling configuration (e.g., the bundling configuration for semi-persistent scheduling) may be a separate configuration. The UE may determine that a periodicity associated with the downlink semi-persistent scheduling is less than a threshold value. In some cases, the bundling configuration for downlink semi-persistent scheduling may be available if the periodicity associated with the downlink semi-persistent scheduling is smaller than a threshold (such as, a threshold number of slots).

According to one or more examples, the UE may determine that the second reference signal bundling configuration includes a bundling configuration for reference signals associated with one or more semi-persistent scheduling configurations on a cell. That is, the UE may determine that the bundling configuration for reference signals associated with one or more semi-persistent scheduling configurations on the same cell may or may not be bundled together. The one or more semi-persistent scheduling configurations may be based on one or more of a resource block allocation, a rank, or a modulation and coding scheme. In some examples, the UE may also determine that the reference signals associated with one or more semi-persistent scheduling configurations may not bundle with the reference signals associated with one or more non-semi-persistent scheduling configurations. For examples, the second reference signal bundling configuration may configure the UE to refrain from bundling a reference signal associated with a semi-persistent scheduling with a reference signal associated with a non-semi-persistent scheduling.

Figure 4:
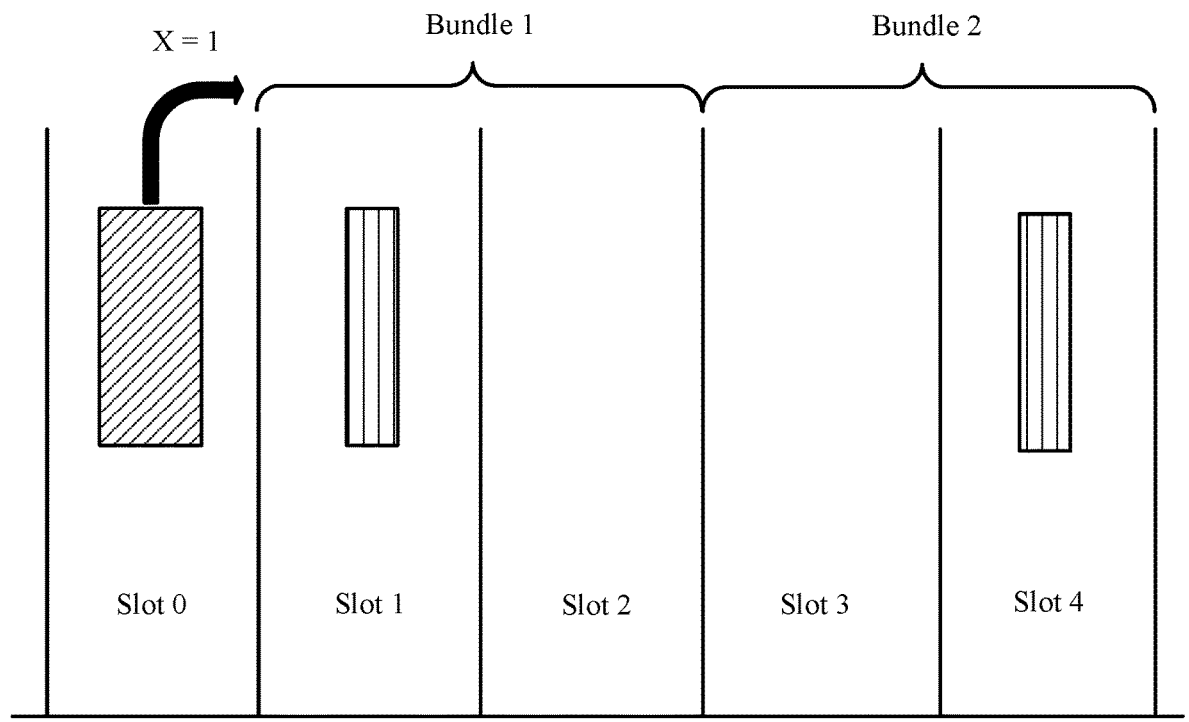
FIG. 4 illustrates an example of a timeline that supports look-ahead reference signal bundling determination for time-domain reference signal bundling in accordance with aspects of the present disclosure.
Figure 4:
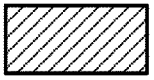
Figure 4:

FIG. 4 illustrates an example of a timeline 400 that supports look-ahead reference signal bundling determination for time-domain reference signal bundling in accordance with aspects of the present disclosure. In some examples, the timeline 400 may implement aspects of the wireless communications system 100 as described with reference to FIG. 1 and the wireless communications system 200 as described with reference to FIG. 2. The timeline 400 illustrates procedures for upcoming reference signal bundling determination in multiple time units (such as slots) to facilitate time-domain reference signal bundling for physical channels communicated between one or more base stations and a UE, which may be examples of the corresponding devices as described with reference to FIG. 1.

The timeline 400 shows a series of multiple time units (e.g., slot 0, slot 1, slot 2, slot 3, and slot 4). Although depicted as slots in the example of FIG. 4, it may be understood that the time units may include, for example, any type of scheduling units for wireless communications, such as slots, mini-slots, a combination of slots and mini-slots, frames, subframes, symbol groups, and the like. In this example, the timeline 400 includes 5 time units. It is to be understood that the techniques described herein may be similarly applied across any greater or lesser number of time units. The base station and the UE may communicate uplink and downlink transmissions during each of the multiple time units. For example, during one or more of the time units, the base station may transmit control signaling (via, e.g., downlink control indictor, radio resource control signaling, etc.) and downlink data transmissions (e.g., in a physical downlink shared channel) to the UE.

In some cases, during one or more of the time units (e.g., slot 0, slot 1, slot 2, slot 3, and slot 4), the base station may transmit to the UE control signals and/or physical channel transmissions. The UE may receive a control signal during a first time unit. In the example of FIG. 4, the UE receives a control signal (e.g., downlink control indicator 405) during slot 0 of the timeline 400. The downlink control indicator 405 may include an indication of a reference signal bundling configuration associated with one or more physical channel types which may be potentially scheduled during a plurality of time units (such as slot 1, slot 2, slot 3, and slot 4) after slot 0 of the timeline 400. The one or more physical channel types may include one or more of a physical downlink shared channel, a demodulation reference signal, a cell-specific reference signal, a channel state information reference signal, a physical downlink control channel, or a positioning reference signal. In some cases, the reference signal bundling configuration may indicate that the base station will be communicating the one or more physical channels according to a precoding.

As depicted in the example of FIG. 4, the UE may receive a control signal (e.g., downlink control indicator 405) during slot 0, and may determine information related to reference signal bundling of potential data receptions for a plurality of slots in the future. That is, the downlink control indicator 405 may provide information related to different bundling configurations associated with the plurality of slots. As previously discussed, the information related to reference signal bundling may be independent of whether or not the UE would actually be scheduled during the future time units (such as slot 1, slot 2, slot 3, and slot 4). In the example of FIG. 4, the base station may indicate (via downlink control indicator 405) that every 2 slots, starting "X" slots after receiving the control signal, are bundled for a window of time. In some examples, the UE may continue to determine that every 2 slots are bundled for a configured number of slots.

Additionally or alternatively, the UE may continue to determine that every 2 slots are bundled for all slots remaining in a frame. In some examples, the UE may continue to determine that every 2 slots are bundled until a new control signal is received at the UE. For example, the UE may receive a new control signal that may update the reference signal bundling configuration. In such cases, the UE may use the updated reference signal bundling configuration to determine bundling for an upcoming plurality of time units (such as slots). According to some examples, the base station may use the indication of the reference signal bundling configuration to configure the UE to determine (e.g., assume) that the same precoding scheme is applied (e.g., by one or more base stations) for the physical channel types which are scheduled during every 2 slots (such as slot 1 and slot 2, and slot 3 and slot 4) within the window of time. In For instance, the UE may determine (e.g., assume) that any of the physical channels received in slot 1 and slot 2 may be used to infer the channel of any other physical channel received inside slot 1 and slot 2. Similarly, the UE may determine (e.g., assume) that any of the physical channels received in slot 3 and slot 4 may be used to infer the channel of any other physical channel received inside slot 3 and slot 4.

Upon receiving the indication of the reference signal bundling configuration, the UE may determine a plurality of time units (e.g., the plurality of time units bundled together) based on the reference signal bundling configuration. As depicted herein, the UE may receive the downlink control indicator 405 and determine that the reference signal bundling configuration indicates that X=1. In such an example, the UE may determine that every 2 slots, starting from slot 1, are bunded together. In some examples, the UE may determine that any transmissions in a number of consecutive slots within a period after receiving the downlink control indicator 405, will be bundled together (such as using demodulation reference signal bundling). Additionally or alternatively, the UE may determine that any transmissions in a number of consecutive slots within a period from the frame boundary, will be bundled together. Further, the UE may determine an identifier associated with each time unit included in the plurality of time units (e.g., the plurality of time units that are bundled together).

In some examples, the UE may determine the identifier based on the reference signal bundling configuration. According to some examples, the control signal (e.g., downlink control indicator 405) may indicate that transmissions in specific slots will be bundled together. As depicted herein, the downlink control indicator 405 may indicate that slot 1 and slot 2 are bundled according to a first bundling configuration and slot 3 and slot 4 are bundled according to a second bundling configuration.

As previously discussed, the base station may indicate the reference signal bundling configuration using a bit included in the control signal (e.g., downlink control indicator 405). For example, if the bit in the downlink control indicator 405 includes a first value (such as 1), then the UE may be configured to determine (e.g., assume) bundling of upcoming time slots, and if the bit in the downlink control indicator 405 includes a first value (such as 0), then the UE may be configured to determine (e.g., assume) that there is no upcoming bundling, or vice versa. In some cases, the base station may indicate the reference signal bundling configuration using two or more bits included in the control signal (e.g., downlink control indicator 405). For instance, if the bits in the downlink control indicator 405 includes a first value (such as 00), then the UE may be configured to determine (e.g., assume) a first type of bundling of upcoming time slots (e.g., every 2 slots is bundled), and if the bits in the downlink control indicator 405 include a second value (such as 01, 10, 11, etc.), then the UE may be configured to determine (e.g., assume) a second type of bundling of upcoming time slots (e.g., every 4 slots is bundled), or any other combination thereof.

In some examples, the control signal (e.g., downlink control indicator 405) may include information that a number of slots (e.g., 2 slots) following the control signal receiving slot (e.g., slot 0), are periodically bundled. In the example of FIG. 4, the UE may determine that every 2 slots following slot 0 are bundled together. For instance, the UE may determine that slot 1 and slot 2 are bundled together (bundle 1), and slot 3 and slot 4 are bundled together (bundle 2). In some examples, the UE may receive a scheduling configuration (not shown) of one or more physical channels of the one or more physical channel types. The UE may then receive the one or more physical channels during the plurality of time units. As depicted herein, the UE may receive a first physical channel 410 during slot 1 of the timeline 400, and second physical channel 410 during slot 4 of the timeline 300. In some examples, the UE may determine (e.g., assume) that the same precoder is used to encode the transmissions on slot 1 and the slot 2 of the timeline 400.

Additionally, the UE may determine (e.g., assume) that the same precoder is used to encode the transmissions on slot 3 and the slot 4 of the timeline 400. In some examples, the UE may determine whether the physical channels (e.g., the first physical channel 410 and the second physical channel 410) are received within the plurality of time units indicated in the control signal (e.g., downlink control indicator 405). That is, the UE may determine whether the physical channels are received in bundled time slots. Following the previous example, the UE may determine whether the physical channels are received within every 2 slots following slot 0 (e.g., either within slot 1 and slot 2 or within slot 3 and slot 4). Upon determining that the first physical channel 410 is received within slot 1 and slot 2, the UE may bundle the first physical channel 410 according to a first bundling configuration (bundle 1). Additionally, upon determining that the second physical channel 410 is received within slot 3 and slot 4, the UE may bundle the second physical channel 410 according to a second bundling configuration (bundle 2).

Figure 5:
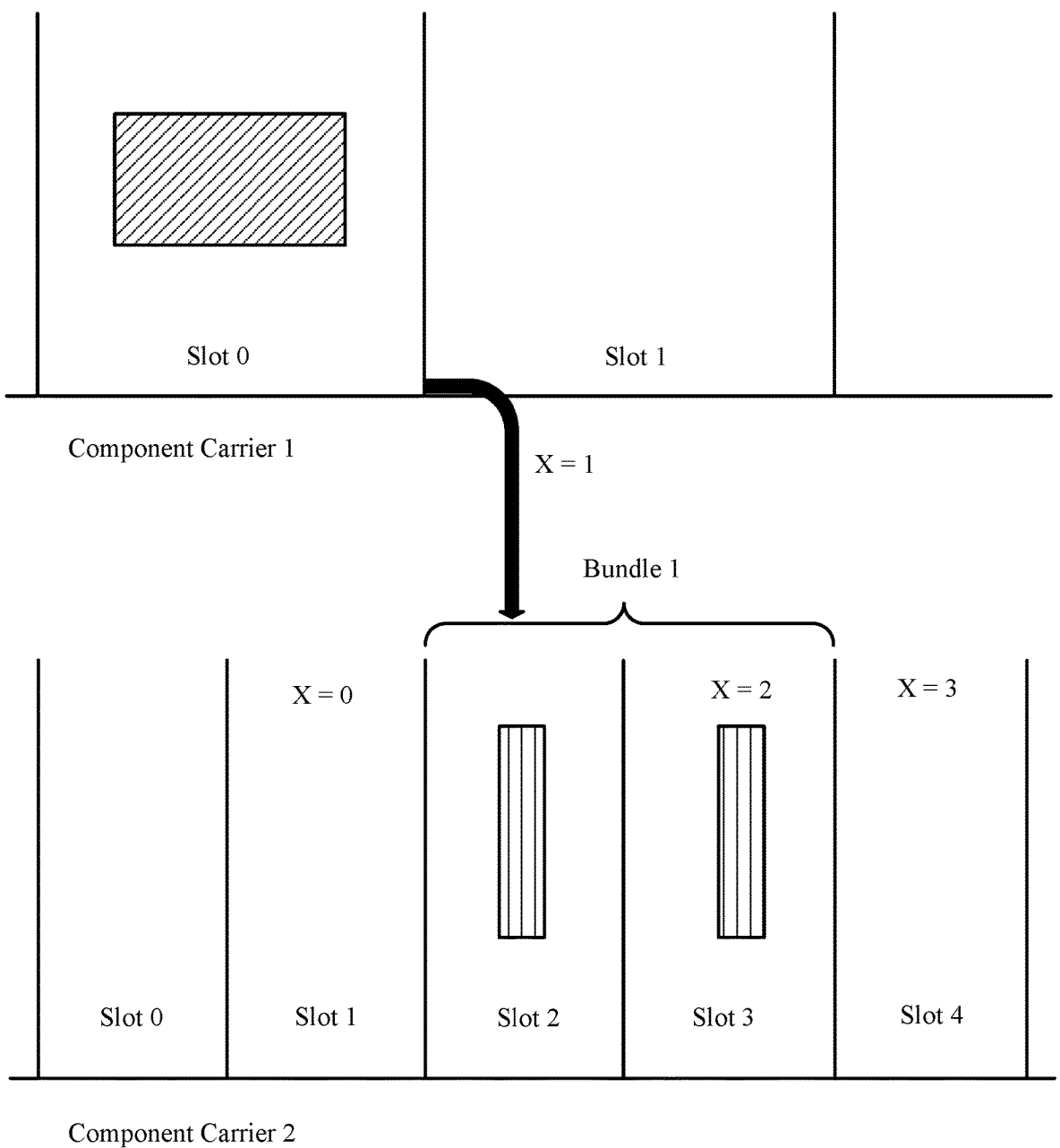
FIG. 5 illustrates an example of a timeline that supports look-ahead reference signal bundling determination for time-domain reference signal bundling in accordance with aspects of the present disclosure.

FIG. 5 illustrates an example of a timeline 500 that supports look-ahead reference signal bundling determination for time-domain reference signal bundling in accordance with aspects of the present disclosure. In some examples, the timeline 500 may implement aspects of the wireless communications system 100 as described with reference to FIG. 1 and the wireless communications system 200 as described with reference to FIG. 2. The timeline 500 illustrates procedures for upcoming reference signal bundling determination across multiple component carriers to facilitate time-domain reference signal bundling for physical channels communicated between one or more base stations and a UE, which may be examples of the corresponding devices as described with reference to FIG. 1.

The timeline 500 shows a first component carrier (e.g., component carrier 1) and a second component carrier (e.g., component carrier 2). The first component carrier includes a series of multiple time units (e.g., slot 0 and slot 1) and the second component carrier includes a series of multiple time units (e.g., slot 0, slot 1, slot 2, slot 3, and slot 4). As depicted herein, the first component carrier and the second component carrier may be associated with different numerologies. For example, the first component carrier may be associated with 15 kHz and the second component carrier may be associated with 30 kHz. Although depicted as slots in the example of FIG. 5, it may be understood that the time units may include, for example, any type of scheduling units for wireless communications, such as slots, mini-slots, a combination of slots and mini-slots, frames, subframes, symbol groups, and the like. Although the example timeline 500 of FIG. 5 shows 2 time units in component carrier 1, and 5 time units in component carrier 2, it is to be understood that the techniques described herein may be similarly applied across any greater or lesser number of time units. As previously described, the base station and the UE may communicate uplink and downlink transmissions during each of the multiple time units across both component carrier 1 and component carrier 2.

In some cases, the UE may receive control signals during one or more of the time units (e.g., slot 0 and slot 1) of the first component carrier (component carrier 1). The UE may also receive physical channel transmissions during one or more of the time units (e.g., slot 0, slot 1, slot 2, slot 3, and slot 4) of the second component carrier (component carrier 2). The UE may receive a control signal during a first time unit. As depicted in the example of FIG. 5, the UE may receive a control signal (e.g., downlink control indicator 505) during slot 0 of component carrier 1 in the timeline 500. The control signal (e.g., downlink control indicator 505) may include an indication of a reference signal bundling configuration associated with one or more physical channel types which may be potentially scheduled during a plurality of time units (such as slot 1, slot 2, slot 3, and slot 4) of component carrier 2 in the timeline 500.

In some examples, the UE may identify a component carrier identifier based on the reference signal bundling configuration. That is, the UE may determine that the control signal (e.g., downlink control indicator 505) is included in the first component carrier (component carrier 1), and indicate an identifier for a second component carrier (component carrier 2) over which the UE will potentially receive transmissions. The UE may determine the second component carrier (component carrier 2) based on the component carrier identifier included in the reference signal bundling configuration (e.g., the reference signal bundling configuration indicated using the downlink control indicator 505). In some examples, the downlink control indicator 505 in the first component carrier may provide information related to reference signal bundling of potential data receptions for a plurality of slots in the second component carrier. The information related to reference signal bundling may be independent of whether or not the UE would actually be scheduled during the time units (such as slot 1, slot 2, slot 3, and slot 4) in the second component carrier.

According to some examples, the indication of the reference signal bundling configuration may be referred to as a look-ahead dynamic reference signal bundling indication across component carriers or look-ahead demodulation reference signal bundling dynamic indication with different numerology for each component carrier. In one example, the base station may use the indication of the reference signal bundling configuration to configure the UE to determine (e.g., assume) that the same precoding scheme has been applied for the physical channel types which are scheduled during the future time units (such as slot 1, slot 2, slot 3, and slot 4) in the second component carrier.

According to one or more aspects of the present disclosure, upon receiving the indication of the reference signal bundling configuration, the UE may determine a plurality of time units (e.g., the plurality of time units bundled together) based on the reference signal bundling configuration. In some examples, the UE may receive the downlink control indicator 505 and determine that the reference signal bundling configuration indicates that bundled slots start X slots (where X=0, 1, 2, . . . ) after the last slot which collides with the slot over which the control signal was received. In some cases, the UE may determine the last slot in the first component carrier according to the numerology of the downlink control indicator 505, and may determine the last slot in the second component carrier according to the numerology of the bundled slots. In some cases, the last slot in the first component carrier may refer to the slot carrying the control signal with the reference signal bundling configuration.

In some examples, the UE may determine that any transmissions in a number of consecutive slots within a period in the second component carrier will be bundled together. In one example, if the number of slots is equal to 2, and the UE receives transmissions in two non-adjacent slots (e.g., with one gap slot in between), then the UE may determine (e.g., assume) that the reference signals associated with the transmissions in the two non-adjacent slots are not bundled. Additionally or alternatively, the UE may determine an identifier associated with each time unit included in the plurality of time units (e.g., the plurality of time units that are bundled together). In some examples, the UE may determine the identifier based on the reference signal bundling configuration. According to some examples, the control signal (e.g., downlink control indicator 505) may indicate that transmissions in specific slots will be bundled together. As depicted herein, the downlink control indicator 505 may indicate that slot 2 and slot 3 of the second component carrier are bundled.

In some examples, the base station may configure the UE with an offset (e.g., a delay) to be applied before a reference time at which the UE may begin bundling the time units. The offset may define a duration of time for the UE to wait before applying the start of the bundling. The base station may configure the offset, for example, as a number of slots and/or a number of symbols within a transmission time interval. In some cases, the offset may be defined with reference to the slot within which the control signal is received (e.g., downlink control indicator 505). In some examples, the UE may determine the reference time based on the offset (e.g., the reference time would be at the point in time at the end of the duration of the offset, when the UE begins bundling). For instance, the UE may identify a number of offset time units based on the reference signal bundling configuration. The UE may then identify a number of consecutive time units after the time unit within which the control signal is received, and the number of offset time units. In some cases, the UE determines the plurality of time units (in the second component carrier) for receiving the transmissions based on the identified number of time units (not shown herein). Alternatively, the base station may define the offset with reference to a beginning of a frame.

In some cases, the control signal (e.g., downlink control indicator 505) may include information that a number of slots (e.g., 2 slots) following the control signal, are bundled. The UE may receive the downlink control indicator 505 and determine that the reference signal bundling configuration indicates that X=1. In such an example, the UE may determine that a number of slots starting from slot 2 (e.g., the slot after the slot the overlaps with the control signal), are bundled together. In some examples, the UE may determine that the first time unit associated with the first component carrier overlaps with a third time unit associated with the second component carrier.

As depicted herein, the UE may determine that the slot 0 of component carrier 1 overlaps with slot 1 of component carrier 2. The UE may then determine that a plurality of time units for applying the bundling configuration, occurs after the third time unit associated with the second component carrier. In the example of FIG. 5, the UE may determine that the bundled slots begin at slot 2 of component carrier 2. In some examples, the UE may also determine that 2 slots are bundled together (e.g., based on the reference signal bundling configuration). In the example of FIG. 5, the UE may determine that slot 2 and slot 3 of component carrier 2 are bundled together. In some examples, the UE may receive a scheduling configuration (not shown) of one or more physical channels of the one or more physical channel types. The UE may then receive the one or more physical channels during one or more second time units of the plurality of time units (e.g., the plurality of time units in component carrier 2).

In the example of FIG. 5, the UE may receive a first physical channel 510 during slot 2 of the second component carrier (component carrier 2) in the timeline 500, and a second physical channel 510 during slot 2 of the second component carrier (component carrier 2) in the timeline 500. In some examples, the UE may bundle the first physical channel 510 and the second physical channel 510. In some examples, the UE may determine (e.g., assume) that the base station may applied the same precoding (e.g., the same precoder, the same precoding scheme, or the like) to the first physical channel 510 and the second physical channel 510.

Figure 6:
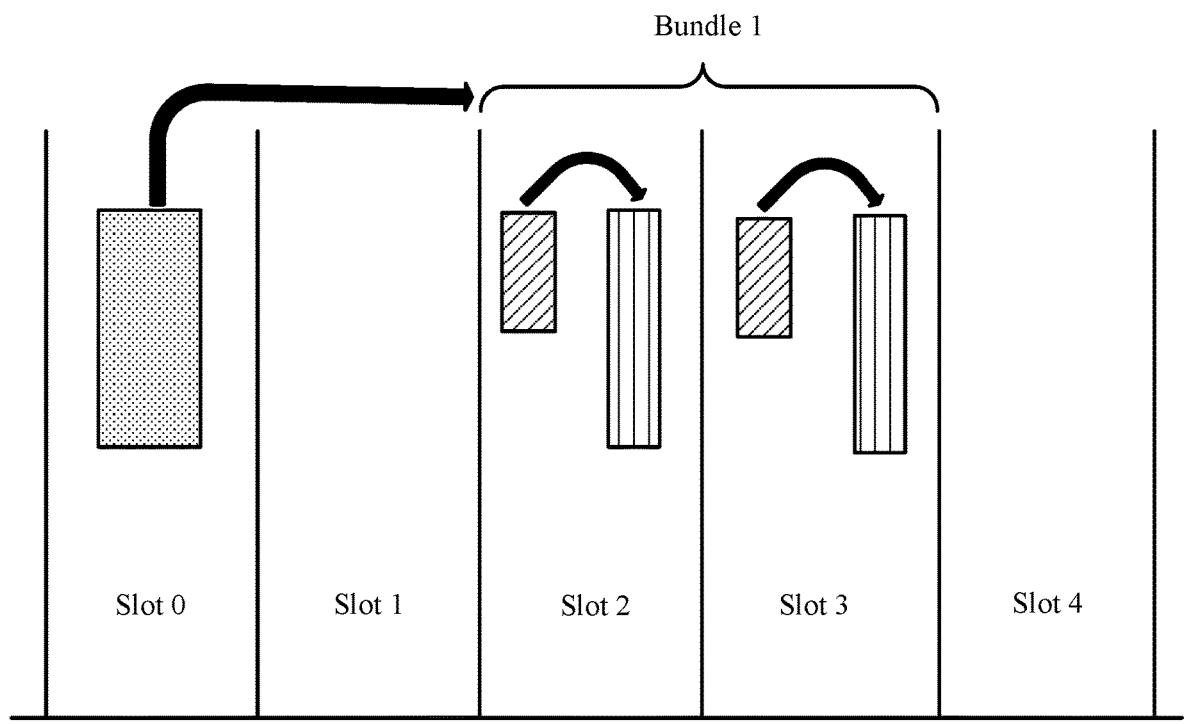
FIG. 6 illustrates an example of a timeline that supports look-ahead reference signal bundling determination for time-domain reference signal bundling in accordance with aspects of the present disclosure.
Figure 6:
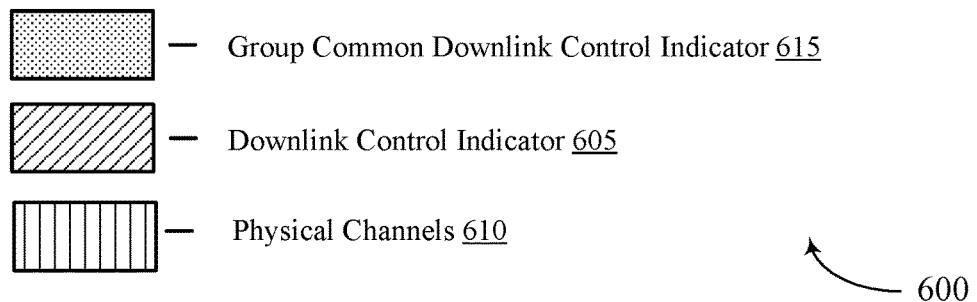

FIG. 6 illustrates an example of a timeline 600 that supports look-ahead reference signal bundling determination for time-domain reference signal bundling in accordance with aspects of the present disclosure. In some examples, the timeline 600 may implement aspects of the wireless communications system 100 as described with reference to FIG. 1 and the wireless communications system 200 as described with reference to FIG. 2. The timeline 600 illustrates procedures for upcoming reference signal bundling determination in multiple time units (such as slots) to facilitate time-domain reference signal bundling for physical channels communicated between one or more base stations and a UE, which may be examples of the corresponding devices as described with reference to FIG. 1.

The timeline 600 shows a series of multiple time units (e.g., slot 0, slot 1, slot 2, slot 3, and slot 4). Although depicted as slots in the example of FIG. 6, it may be understood that the time units may include, for example, any type of scheduling units for wireless communications. The example timeline 600 of FIG. 6 shows 5 time units, but it is to be understood that the techniques described herein may be similarly applied across any greater or lesser number of time units. The base station and the UE may communicate uplink and downlink transmissions during each of the multiple time units. For example, during one or more of the time units, the base station may transmit control signaling (via, e.g., downlink control indictor, group-common downlink control indicator, radio resource control signaling, etc.) and downlink data transmissions (e.g., in a physical downlink shared channel) to the UE.

In some cases, during one or more of the time units (e.g., slot 0, slot 1, slot 2, slot 3, and slot 4), the base station may transmit to the UE control signals and/or physical channel transmissions. In some cases, the base station may communicate the one or more physical channels according to a precoding indicated using the control signal. In other different MU-MIMO scenarios, the base station may transmit a constant precoder across time to one UE. In such cases, it may be likely that that the base station will transmit a constant precoder to the remaining co-scheduled UEs. Therefore, the present disclosure provides for using a group common downlink control indicator to inform all co-scheduled UEs about a look-ahead time-domain bundling configuration. Such an approach may be more efficient when compared to separately indicating the bundling configuration to each UE. As previously discussed, the UE may receive a control signal during a first time unit. As depicted in the example of FIG. 6, the UE may receive a group common control signal (e.g., group common downlink control indicator 615) during slot 0 of the timeline 600. The control signal (e.g., group common downlink control indicator 615) may include an indication of a reference signal bundling configuration associated with one or more physical channel types which may be potentially scheduled during a plurality of time units (such as slot 1, slot 2, slot 3, and slot 4) after slot 0 of the timeline 600.

In some cases, the UE may identify that a field of a plurality of fields is included in the control signal (e.g., group common downlink control indicator 615). In some cases, the UE may determine that the field is associated with the UE (such as, a UE identifier) and includes the reference signal bundling configuration. In one example, the group common downlink control indicator 615 may include multiple slot-bundling indication fields, and a UE is configured to verify a given field (e.g., a field that is associated with the UE). In some examples, multiple UEs may not have the same slot-bundling indication. In such cases, the payloads for multiple UEs may be grouped together to save physical downlink control channel resources. As depicted herein, the base station may use the indication of the reference signal bundling configuration (included in the group common downlink control indicator 615) to configure the UE to determine (e.g., assume) that the base station has applied the same precoding for the physical channel types which are scheduled during future time units (such as slot 1, slot 2, slot 3, and slot 4).

Upon receiving the indication of the reference signal bundling configuration, the UE may determine a plurality of time units (e.g., the plurality of time units bundled together) based on the reference signal bundling configuration. In some examples, the UE may receive the group common downlink control indicator 615 and determine that the reference signal bundling configuration indicates that any transmissions in "X" number of consecutive slots starting "Y" slots after receiving the group common downlink control indicator 615, may be bundled together. Additionally, the UE may determine that the "X" number of consecutive slots are included within a period after receiving the group common downlink control indicator 615. In some examples, the UE may determine that any transmissions in "X" number of consecutive slots within a period from the frame boundary will be bundled together.

In some cases, the UE may determine the "X" number of consecutive slots based on an identifier associated with each time slot included in the "X" number of consecutive slots (e.g., the plurality of time units that are bundled together). In the example of FIG. 6, the group common downlink control indicator 615 may indicate that any transmissions in 2 consecutive slots starting 1 slot after receiving the group common downlink control indicator 615, is bundled together. For instance, the UE may determine that the group common downlink control indicator 615 is received in slot 0 of the timeline 600, and may determine that slot 2 and slot 3 are bundled together.

In some examples, the UE may receive a scheduling configuration of one or more physical channels of the one or more physical channel types. In the example of FIG. 6, the UE receive a downlink control indicator 605 in slot 2 (e.g., a time unit following the slot 0). The UE may then receive the one or more physical channels during one or more second time units of the plurality of time units. In the example of FIG. 6, the UE may receive a first physical channel 610 during slot 2 of the timeline 600.

Additionally or alternatively, the UE may receive, during a fourth time unit after the first time unit (e.g., slot 0), a third control signal. As depicted herein, the UE may receive a downlink control indicator 605 in slot 3 (e.g., fourth time unit occurring after the first time unit). The UE may then receive a second physical channel during the fourth time unit based on the second control signal. That is, the UE may receive a second physical channel 610 during slot 3 of the timeline 600. According to one or more aspects of the present disclosure, the UE may bundle the first physical channel 610 and the second physical channel 610. That is, the UE may determine (e.g., assume) that the base station may applied the same precoding (e.g., the same precoder, the same precoding scheme, or the like) to the first physical channel 610 and the second physical channel 610. In some examples, the UE may also determine (e.g., assume) that the downlink control indicator 605 received in slot 2 is bundled with the downlink control indicator 605 received in slot 3 of the timeline 600.

Figure 7:
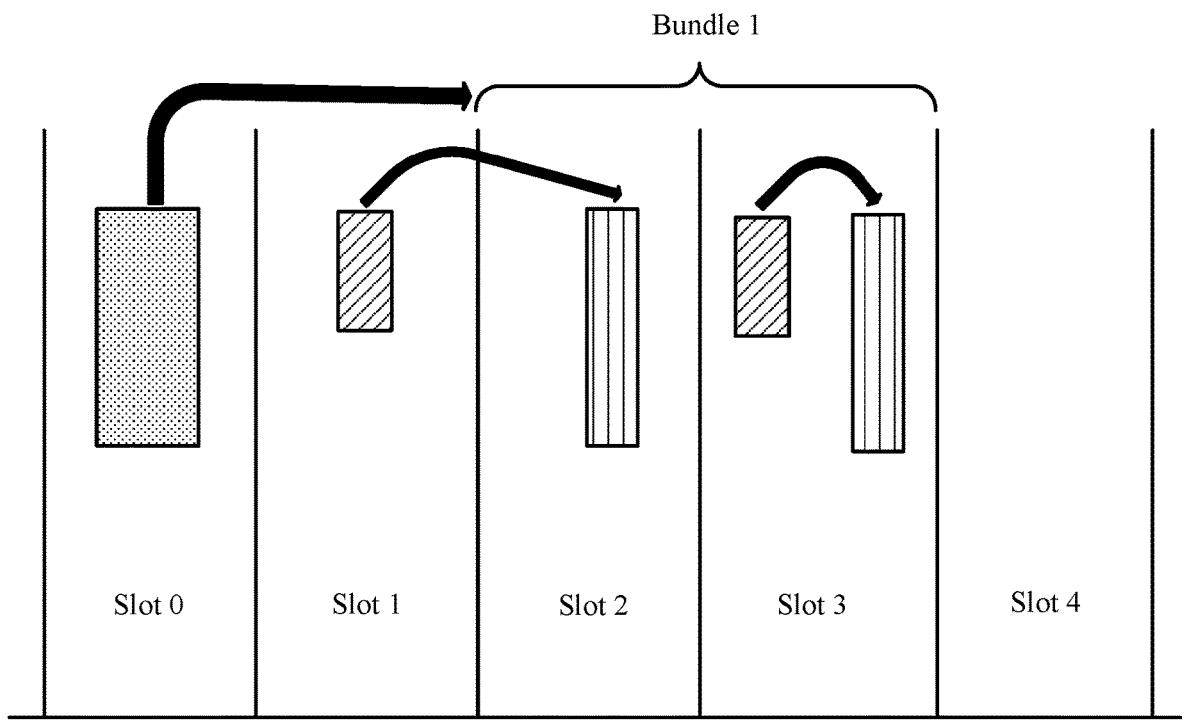
FIG. 7 illustrates an example of a timeline that supports look-ahead reference signal bundling determination for time-domain reference signal bundling in accordance with aspects of the present disclosure.

FIG. 7 illustrates an example of a timeline 700 that supports look-ahead reference signal bundling determination for time-domain reference signal bundling in accordance with aspects of the present disclosure. In some examples, the timeline 700 may implement aspects of the wireless communications system 100 as described with reference to FIG. 1 and the wireless communications system 200 as described with reference to FIG. 2. The timeline 700 illustrates procedures for upcoming reference signal bundling determination in multiple time units (such as slots) to facilitate time-domain reference signal bundling for physical channels communicated between one or more base stations and a UE, which may be examples of the corresponding devices as described with reference to FIG. 1.

The timeline 700 shows a series of multiple time units (e.g., slot 0, slot 1, slot 2, slot 3, and slot 4). Although depicted as slots in the example of FIG. 7, it may be understood that the time units may include, for example, any type of scheduling units for wireless communications. The example timeline 700 of FIG. 7 shows 5 time units, but it is to be understood that the techniques described herein may be similarly applied across any greater or lesser number of time units. The base station and the UE may communicate uplink and downlink transmissions during each of the multiple time units. For example, during one or more of the time units, the base station may transmit control signaling (via, e.g., downlink control indictor, group-common downlink control indicator, radio resource control signaling, etc.) and downlink data transmissions (e.g., in a physical downlink shared channel) to the UE.

In some cases, during one or more of the time units (e.g., slot 0, slot 1, slot 2, slot 3, and slot 4), the base station may transmit, to the UE, control signals and/or physical channel transmissions. In some cases, the base station may communicate the one or more physical channels according to a precoding indicated using the control signal. According to one or more aspects of the present disclosure, the UE may receive a control signal during a first time unit. As depicted in the example of FIG. 7, the UE may receive a group common control signal (e.g., group common downlink control indicator 715) during slot 0 of the timeline 700. The control signal (e.g., group common downlink control indicator 715) may include an indication of a reference signal bundling configuration associated with one or more physical channel types which may be potentially scheduled during a plurality of time units (such as slot 1, slot 2, slot 3, and slot 4) after slot 0 of the timeline 700.

As previously discussed, the UE may identify that a field of a plurality of fields is included in the group common downlink control indicator 615. In some cases, the UE may determine that the field (such as, a UE identifier) is associated with the UE and includes the reference signal bundling configuration. In one example, the group common downlink control indicator 715 may include multiple slot-bundling indication fields, and the UE may be configured to identify a given field (e.g., a field that is associated with the UE) to receive the reference signal bundling configuration.

In some examples, the base station may use the indication of the reference signal bundling configuration (included in the group common downlink control indicator 715) to configure the UE to determine (e.g., assume) that the base station has applied the same precoding for the physical channel types which are scheduled during future time units (such as slot 1, slot 2, slot 3, and slot 4). In some examples, the UE may receive information associated with the reference signal bundling configuration using a radio resource control signal. The UE may then enable the reference signal bundling configuration upon receiving a control signal (such as, the group common downlink control indicator 715 in slot 0).

Upon receiving the indication of the reference signal bundling configuration, the UE may determine a plurality of time units (e.g., the plurality of time units bundled together) based on the reference signal bundling configuration. That is, the UE may identify one or more bits in the group common downlink control indicator 715, and may enable the reference signal bundling configuration based on identifying the one or more bits. In some examples, the UE may receive the group common downlink control indicator 715 and determine that the reference signal bundling configuration indicates that any transmissions in "X" number of consecutive slots starting "Y" slots after receiving the group common downlink control indicator 715, may be bundled together. In the example of FIG. 7, the group common downlink control indicator 715 may indicate that any transmissions in two consecutive slots starting one slot after receiving the group common downlink control indicator 715, is bundled together. For instance, the UE may determine that the group common downlink control indicator 715 is received in slot 0 of the timeline 700, and may determine that slot 2 and slot 3 are bundled together. Additionally, the UE may determine that slot 1 of the timeline 700 is not bundled with slot 2 and slot 3.

In some examples, the UE may receive a scheduling configuration of one or more physical channels of the one or more physical channel types. As depicted herein, the UE may receive a control signal in slot 1 of the timeline 700. The UE may, additionally, receive the one or more physical channels during one or more second time units of the plurality of time units. In the example of FIG. 7, the UE may receive a first physical channel 710 during slot 2 of the timeline 700. Additionally, the UE may receive a second downlink control indicator 705 in slot 3 (e.g., occurring after slot 0). The UE may then receive a second physical channel based on the second downlink control indicator 705. That is, the UE may receive a second physical channel 710 during slot 3 of the timeline 700. According to one or more aspects of the present disclosure, the UE may determine that the first physical channel 710 and the second physical channel 710 are bundled. In some examples, the UE may determine that the downlink control indicator 705 received in slot 1 is not bundled with the downlink control indicator 705 received in slot 3 of the timeline 700.

Figure 8:
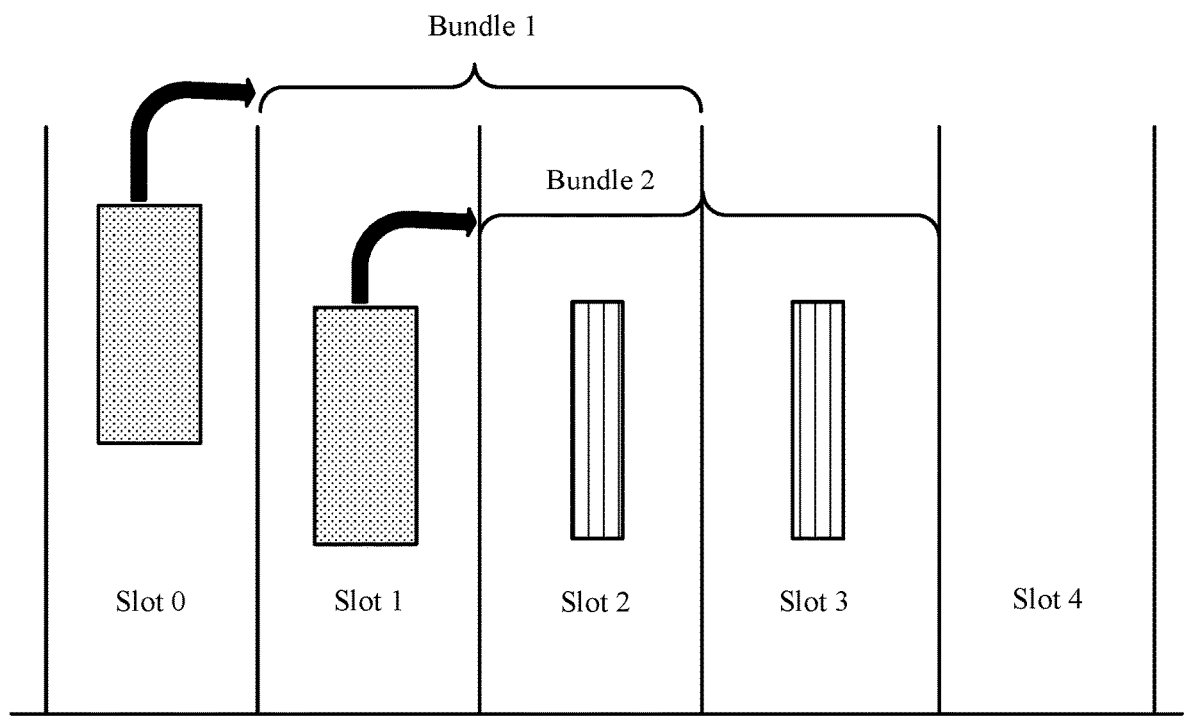
FIG. 8 illustrates an example of a timeline that supports look-ahead reference signal bundling determination for time-domain reference signal bundling in accordance with aspects of the present disclosure.
Figure 8:
Figure 8:

FIG. 8 illustrates an example of a timeline 800 that supports look-ahead reference signal bundling determination for time-domain reference signal bundling in accordance with aspects of the present disclosure. In some examples, the timeline 800 may implement aspects of the wireless communications system 100 as described with reference to FIG. 1 and the wireless communications system 200 as described with reference to FIG. 2. The timeline 800 illustrates procedures for upcoming reference signal bundling determination in multiple time units (such as slots) to facilitate time-domain reference signal bundling for physical channels communicated between one or more base stations and a UE, which may be examples of the corresponding devices as described with reference to FIG. 1.

The timeline 800 shows a series of multiple time units (e.g., slot 0, slot 1, slot 2, slot 3, and slot 4). Although depicted as slots in the example of FIG. 8, it may be understood that the time units may include any type of scheduling units for wireless communications. The example timeline 800 of FIG. 8 shows 5 time units (e.g., slot 0, slot 1, slot 2, slot 3, and slot 4), but it is to be understood that the techniques described herein may be similarly applied across any greater or lesser number of time units. The base station and the UE may communicate uplink and downlink transmissions during each of the multiple time units. For example, during one or more of the time units, the base station may transmit control signaling (via, e.g., downlink control indictor, group-common downlink control indicator, radio resource control signaling, etc.) and downlink data transmissions (e.g., in a physical downlink shared channel) to the UE.

In some cases, during one or more of the time units (e.g., slot 0, slot 1, slot 2, slot 3, and slot 4), the base station may transmit to the UE control signals and/or physical channel transmissions. In some cases, the base station may communicate the one or more physical channels according to a precoding indicated using the control signal. According to one or more aspects of the present disclosure, the UE may receive a control signal during a first time unit. As depicted in the example of FIG. 8, the UE may receive a group common control signal (e.g., group common downlink control indicator 815) during slot 0 of the timeline 800. The control signal (e.g., group common downlink control indicator 815) may include an indication of a reference signal bundling configuration associated with a plurality of time units (such as slot 1, slot 2, slot 3, and slot 4) after slot 0 of the timeline 800. In the example of FIG. 8, the group common downlink control indicator 815 may indicate that slot 1 and slot 2 of the timeline 800 are bundled together. In some examples, the UE may determine (e.g., assume) that the base station has applied the same precoding for the physical channel types which are scheduled during future time units (slot 1 and slot 2, in this example). In some examples, the UE may receive information associated with the reference signal bundling configuration using a radio resource control signal. The UE may then enable the reference signal bundling configuration upon receiving a control signal (such as, the group common downlink control indicator 815 in slot 0).

Additionally or alternatively, the UE may receive a second control signal during a second time unit. As depicted in the example of FIG. 8, the UE may receive a second group common control signal (e.g., a second group common downlink control indicator 815) during slot 1 of the timeline 800. The second group common downlink control indicator 815 may include an indication of a reference signal bundling configuration associated with a plurality of time units (such as slot 2, slot 3, and slot 4) after slot 1 of the timeline 800. In the example of FIG. 8, the second group common downlink control indicator 815 may indicate that slot 2 and slot 3 of the timeline 800 are bundled together. In some examples, the UE may determine a plurality of time units (e.g., the plurality of time units bundled together) based on the reference signal bundling configuration. As depicted herein, the UE may determine that slot 1, slot 2 and slot 3 are bundled together based on the group common downlink control indicator 815 and the second group common downlink control indicator 815. In some examples, the UE may determine (e.g., assume) that the base station has applied the same precoding for the physical channel types which are scheduled during slot 1, slot 2, and slot 3 of the timeline 800.

In some examples, the UE may receive a scheduling configuration of one or more physical channels of the one or more physical channel types. As depicted herein, the UE may receive the one or more physical channels during one or more second time units of the plurality of time units. For instance, the UE may receive a first physical channel 810 during slot 2 of the timeline 800. Additionally, the UE may receive a second physical channel 810 during slot 3 of the timeline 800. According to one or more aspects of the present disclosure, the UE may determine that the first physical channel 810 and the second physical channel 810 are bundled. In some examples, the UE may determine that the second group common downlink control indicator 815, first physical channel 810, and the second physical channel 810 are bundled.

Figure 9:
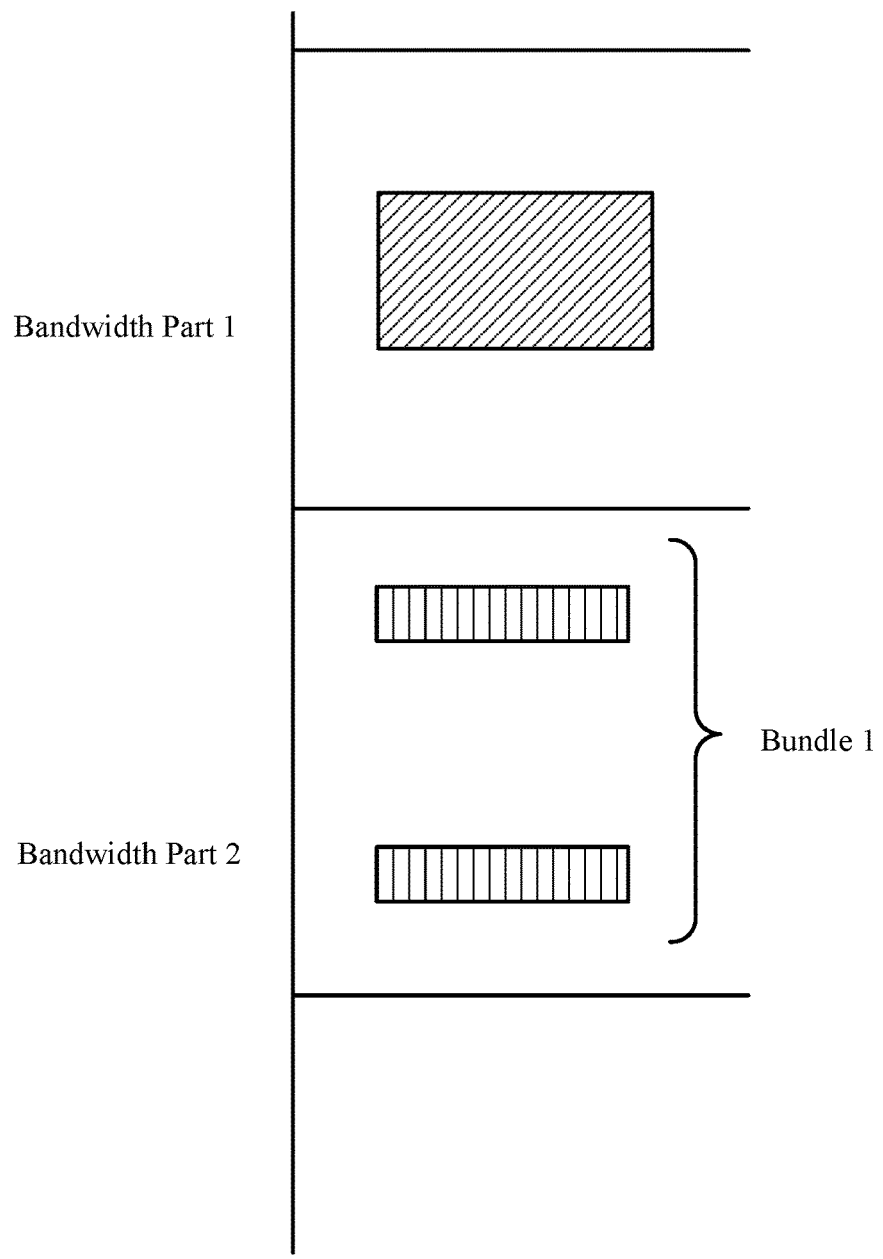
FIG. 9 illustrates an example of a resource configuration that supports look-ahead reference signal bundling determination for time-domain reference signal bundling in accordance with aspects of the present disclosure.

FIG. 9 illustrates an example of a resource configuration 900 that supports look-ahead reference signal bundling determination for time-domain reference signal bundling in accordance with aspects of the present disclosure. In some examples, the resource configuration 900 may implement aspects of the wireless communications system 100 as described with reference to FIG. 1 and the wireless communications system 200 as described with reference to FIG. 2. The resource configuration 900 illustrates procedures for upcoming reference signal bundling determination across multiple bandwidth parts to facilitate reference signal bundling for physical channels communicated between one or more base stations and a UE, which may be examples of the corresponding devices as described with reference to FIG. 1.

The resource configuration 900 shows a first bandwidth part (e.g., bandwidth part 1) and a second bandwidth part (e.g., bandwidth part 2). The first bandwidth part and the second bandwidth part may be associated with different numerologies. As previously described, the base station and the UE may communicate uplink and downlink transmissions across both bandwidth part 1 and bandwidth part 2. In some cases, the UE may receive control signals included in the first bandwidth part (bandwidth part 1). The UE may also receive physical channel transmissions included in the second bandwidth part (bandwidth part 2). As depicted in the example of FIG. 9, the UE may receive a control signal (e.g., downlink control indicator 905) in bandwidth part 1. The control signal (e.g., downlink control indicator 905) may include an indication of a reference signal bundling configuration associated with one or more physical channel types which may be potentially scheduled in bandwidth part 2. In some examples, the UE may identify a bandwidth part identifier based on the reference signal bundling configuration. That is, the UE may determine that the control signal (e.g., downlink control indicator 905) is included in the first bandwidth part (bandwidth part 1), and indicate an identifier for a second bandwidth part (bandwidth part 2).

In some cases, the UE may potentially receive transmissions on the second bandwidth part. The UE may determine the second bandwidth part (bandwidth part 2) based on the bandwidth part identifier included in the reference signal bundling configuration (e.g., the reference signal bundling configuration indicated using the downlink control indicator 905). In some examples, the downlink control indicator 905 in the first bandwidth part may provide information related to reference signal bundling of potential data receptions in the second bandwidth part. In one example, the base station may use the indication of the reference signal bundling configuration to configure the UE to determine (e.g., assume) that the base station has applied the same precoding for the physical channel types which are scheduled during the future time units in the second bandwidth part.

According to one or more aspects of the present disclosure, upon receiving the indication of the reference signal bundling configuration, the UE may determine a plurality of time units (e.g., the plurality of time units bundled together) based on the reference signal bundling configuration. In some examples, the UE may determine that any transmissions in a number of consecutive slots within a period in the second bandwidth part, will be bundled together. In one example, the base station may configure the UE with an offset (e.g., a delay) to be applied before a reference time at which the UE may begin bundling the time units. The offset may define a duration of time for the UE to wait before applying the start of the bundling in the second bandwidth part.

In some cases, the UE may determine a plurality of time units for applying the bundling configuration. In the example of FIG. 9, the UE may determine that the bundled slots are included in the bandwidth part 2. In some examples, the UE may receive a first physical channel 910 in the second bandwidth part (bandwidth part 2), and a second physical channel 910 in the second bandwidth part (bandwidth part 2). In some examples, the UE may bundle the first physical channel 910 and the second physical channel 910 according to the reference signal bundling configuration.

Figure 10:
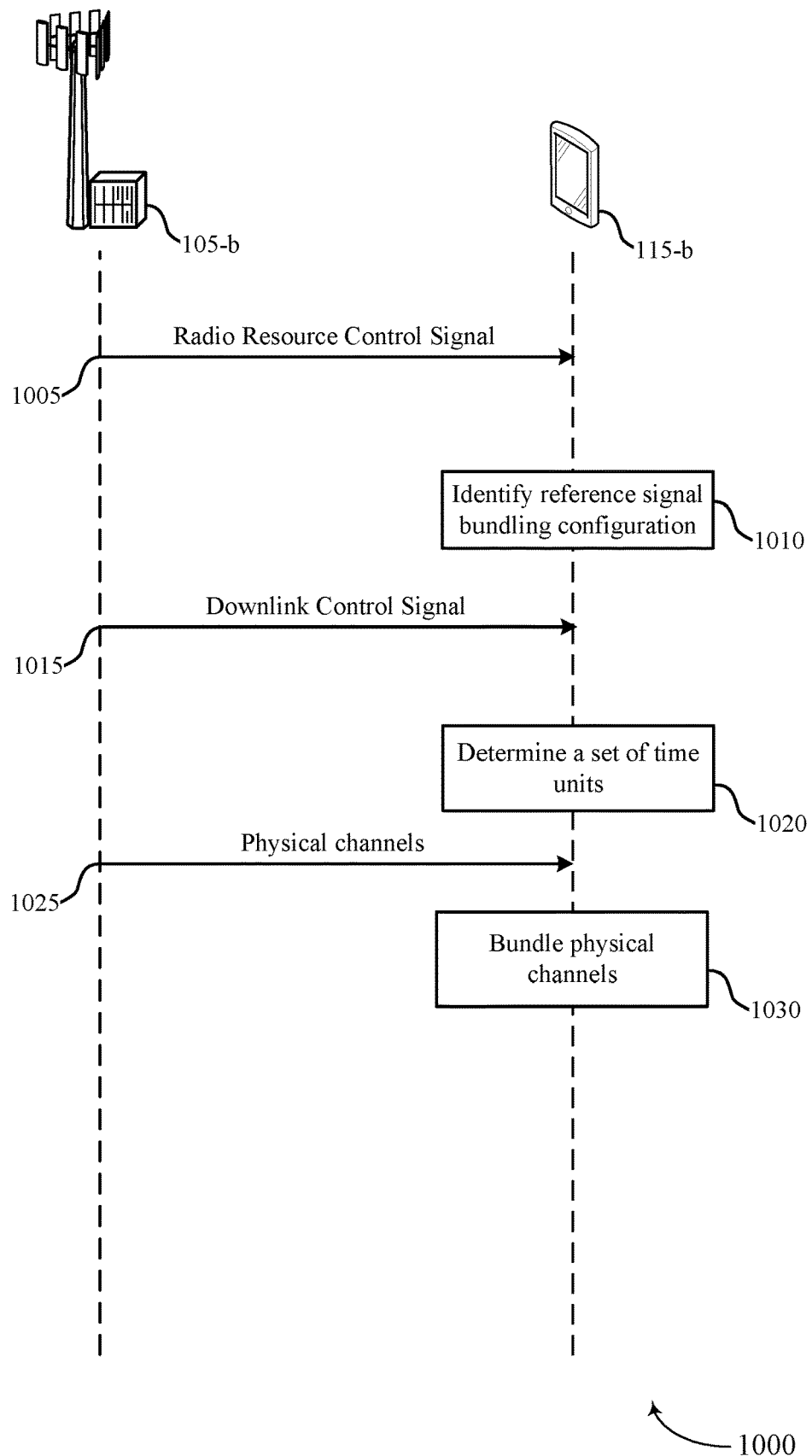
FIG. 10 illustrates an example of a process flow that supports look-ahead reference signal bundling determination for time-domain reference signal bundling in accordance with aspects of the present disclosure.

FIG. 10 illustrates an example of a process flow 1000 that supports look-ahead reference signal bundling determination for time-domain reference signal bundling in accordance with aspects of the present disclosure. In some examples, the process flow 1000 may implement aspects of the wireless communications system 100, and wireless communications system 200 described with reference to FIGS. 1 and 2. The process flow 1000 may include base station 105-*b* and UE 115-*b*, which may be examples of the corresponding devices described with reference to FIGS. 1 through 9. Base station 105-*b* and UE 115-*b* may support upcoming reference signal bundling determination for time-domain reference signal bundling in NR systems.

In the following description of the process flow 1000, the operations between the UE 115-*b* and the base station 105-*b* may be transmitted in a different order than the exemplary order shown. The operations performed by UE 115-*b* or base station 105-*b* may be performed in different orders or at different times than the exemplary order shown. Certain operations may also be left out of the process flow 1000, or other operations may be added to the process flow 1000. Further, base station 105-*b* and UE 115-*b* are not meant to be representative, as the described features may be associated with any number of devices.

At 1005, the UE 115-*b* may receive, from the base station 105-*b*, a radio resource control signal indicating the reference signal bundling configuration. At 1010, the UE 115-*b* may identify the reference signal bundling configuration based on receiving the radio resource control signal.

At 1015, the UE 115-*b* may receive, from the base station 105-*b* and during a first time unit, a control signal. The control signal may include an indication of a reference signal bundling configuration associated with one or more physical channel types which may be potentially scheduled during a plurality of time units after the first time unit. In some examples, the one or more physical channel types may include one or more of a physical downlink shared channel, a demodulation reference signal, a cell-specific reference signal, a channel state information reference signal, a physical downlink control channel, or a positioning reference signal.

At 1020, the UE 115-*b* may determine the plurality of time units based on the indication of the reference signal bundling configuration. In some examples, the plurality of time units may include a plurality of time slots. At 1025, the UE 115-*b* may receive the one or more physical channels during one or more second time units of the plurality of time units. In some cases, prior to receiving the one or more physical channels, the UE 115-*b* may receive a scheduling configuration of one or more physical channels of the one or more physical channel types.

At 1030, the UE 115-*b* may bundle the one or more physical channels across two or more time units of the plurality of time units based on the reference signal bundling configuration. For example, the UE 115-*b* may determine (e.g., assume) that the base station 105-*b* has applied a precoding to the one or more physical channels across the two or more of the plurality of time units based on the reference signal bundling configuration.

The operations performed by the base station 105-*b* and the UE 115-*b*, as part of, but not limited to, process flow 1000 may provide improvements to communication links in wireless communications systems. Further, the operations performed by the base station 105-*b* and the UE 115-*b* as part of, but not limited to, process flow 1000 may provide benefits and enhancements to the operation of the UE 115-*e* while performing communications with a high throughput and low latency. For example, the described methods in the process flow 1000 may support enhanced throughput and resource savings in NR applications, among other advantages.

Figure 11:
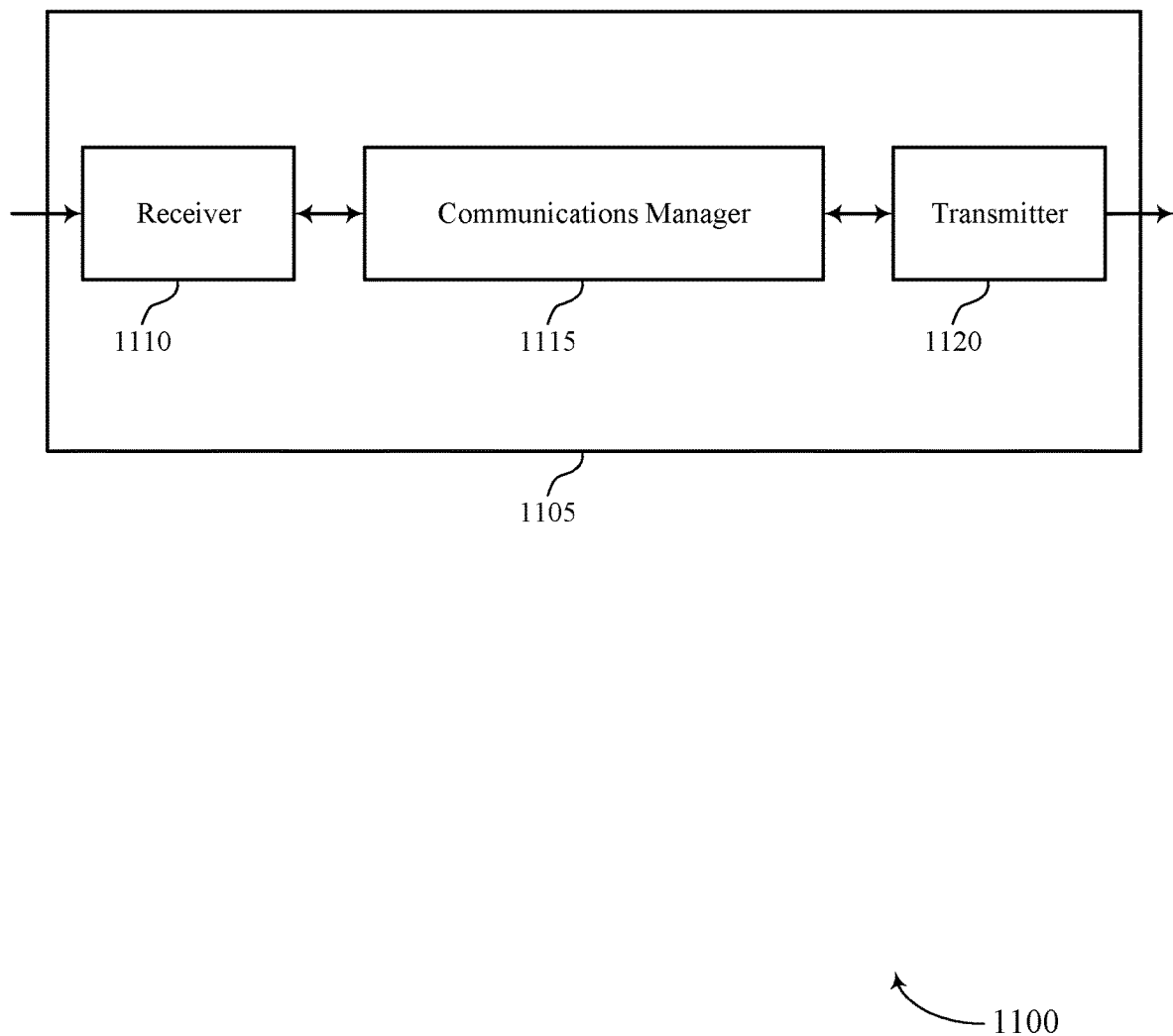
FIGS. 11 and 12 show block diagrams of devices that support look-ahead reference signal bundling determination for time-domain reference signal bundling in accordance with aspects of the present disclosure.

FIG. 11 shows a block diagram 1100 of a device 1105 that supports look-ahead reference signal bundling determination for time-domain reference signal bundling in accordance with aspects of the present disclosure. The device 1105 may be an example of aspects of a UE 115 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to look-ahead reference signal bundling determination for time-domain reference signal bundling, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may receive, from one or more base stations during a first time unit, a control signal including an indication of a reference signal bundling configuration associated with one or more physical channel types which may be potentially scheduled during a plurality of time units after the first time unit. The communications manager 1115 may determine the plurality of time units based on the indication of the reference signal bundling configuration. The communications manager 1115 may receive scheduling configuration of one or more physical channels of the one or more physical channel types, receive the one or more physical channels during one or more second time units of the plurality of time units. The communications manager 1115 may bundle the one or more physical channels across two or more of the plurality of time units based on the reference signal bundling configuration. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
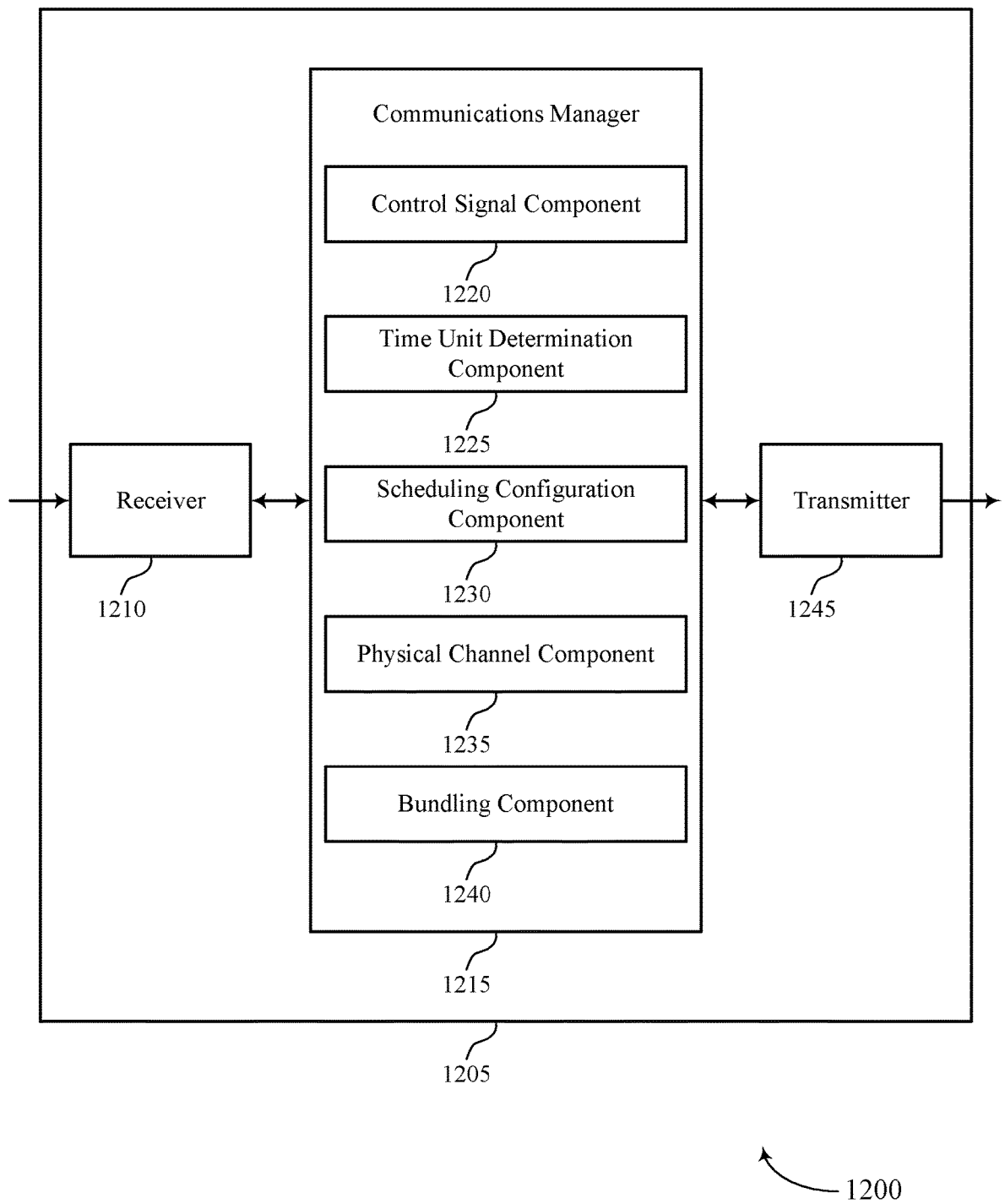

FIG. 12 shows a block diagram 1200 of a device 1205 that supports look-ahead reference signal bundling determination for time-domain reference signal bundling in accordance with aspects of the present disclosure. The device 1205 may be an example of aspects of a device 1105, or a UE 115 as described herein. The device 1205 may include a receiver 1210, a communications manager 1215, and a transmitter 1245. The device 1205 may also include a processor. Each of these components may be in communication with one another (e.g., via one or more buses).

The receiver 1210 may receive information such as packets, user data, or control information associated with various information channels (e.g., control channels, data channels, and information related to look-ahead reference signal bundling determination for time-domain reference signal bundling, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a control signal component 1220, a time unit determination component 1225, a scheduling configuration component 1230, a physical channel component 1235, and a bundling component 1240. The communications manager 1215 may be an example of aspects of the communications manager 1410 described herein.

The control signal component 1220 may receive, from one or more base stations during a first time unit, a control signal including an indication of a reference signal bundling configuration associated with one or more physical channel types which may be potentially scheduled during a plurality of time units after the first time unit. The time unit determination component 1225 may determine the plurality of time units based on the indication of the reference signal bundling configuration. The scheduling configuration component 1230 may receive scheduling configuration of one or more physical channels of the one or more physical channel types. The physical channel component 1235 may receive the one or more physical channels during one or more second time units of the plurality of time units. The bundling component 1240 may bundle the one or more physical channels across two or more of the plurality of time units based on the reference signal bundling configuration.

The transmitter 1245 may transmit signals generated by other components of the device 1205. In some examples, the transmitter 1245 may be collocated with a receiver 1210 in a transceiver component. For example, the transmitter 1245 may be an example of aspects of the transceiver 1420 described with reference to FIG. 14. The transmitter 1245 may utilize a single antenna or a set of antennas.

Figure 13:
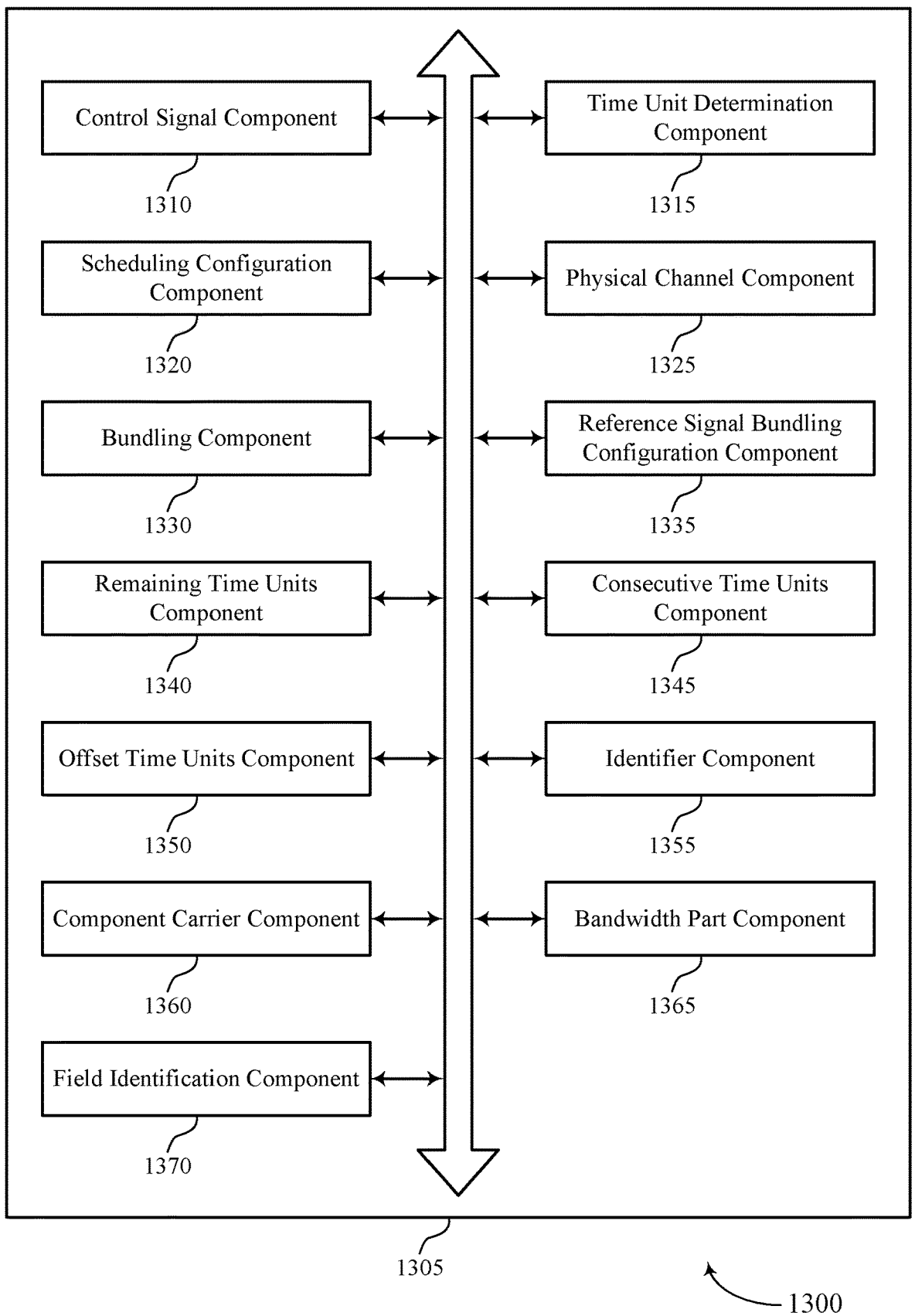
FIG. 13 shows a block diagram of a communications manager that supports look-ahead reference signal bundling determination for time-domain reference signal bundling in accordance with aspects of the present disclosure.

FIG. 13 shows a block diagram 1300 of a communications manager 1305 that supports look-ahead reference signal bundling determination for time-domain reference signal bundling in accordance with aspects of the present disclosure. The communications manager 1305 may be an example of aspects of a communications manager 1115, a communications manager 1215, or a communications manager 1410 described herein. The communications manager 1305 may include a control signal component 1310, a time unit determination component 1315, a scheduling configuration component 1320, a physical channel component 1325, a bundling component 1330, a reference signal bundling configuration component 1335, a remaining time units component 1340, a consecutive time units component 1345, an offset time units component 1350, an identifier component 1355, a component carrier component 1360, a bandwidth part component 1365, and a field identification component 1370. Each of these components may communicate, directly or indirectly, with one another (e.g., via one or more buses).

The control signal component 1310 may receive, from one or more base stations during a first time unit, a control signal including an indication of a reference signal bundling configuration associated with one or more physical channel types which may be potentially scheduled during a plurality of time units after the first time unit. In some cases, the one or more physical channel types include one or more of a physical downlink shared channel, a demodulation reference signal, a cell-specific reference signal, a channel state information reference signal, a physical downlink control channel, or a positioning reference signal. In some cases, the control signal includes a downlink control indicator.

The time unit determination component 1315 may determine the plurality of time units based on the indication of the reference signal bundling configuration. The scheduling configuration component 1320 may receive scheduling configuration of one or more physical channels of the one or more physical channel types. The physical channel component 1325 may receive the one or more physical channels during one or more second time units of the plurality of time units. The bundling component 1330 may bundle the one or more physical channels across two or more of the plurality of time units based on the reference signal bundling configuration.

In some examples, the bundling component 1330 may determine (e.g., assume) that the same precoding has been applied to the one or more physical channels across the two or more of the plurality of time units based on the reference signal bundling configuration. In some examples, the physical channel component 1325 may receive a second physical channel during a third time unit of the plurality of time units. In some examples, the bundling component 1330 may determine (e.g., assume) that the same precoding has been applied to the second physical channel across the two or more of the plurality of time units based on the reference signal bundling configuration.

In some examples, the control signal component 1310 may receive, from the one or more base stations, a radio resource control signal indicating the reference signal bundling configuration. The reference signal bundling configuration component 1335 may enable the reference signal bundling configuration across the two or more of the plurality of time units based on the indication in the control signal and the reference signal bundling configuration, where bundling the one or more physical channels across the two or more of the plurality of time units is based on enabling the reference signal bundling configuration.

In some examples, the time unit determination component 1315 may determine a first subset of the plurality of time units for receiving the one or more physical channel types based on the reference signal bundling configuration. In some examples, the time unit determination component 1315 may determine a second subset of the plurality of time units for receiving the one or more physical channel types. In some examples, the time unit determination component 1315 may determine that the first subset of the plurality of time units and the second subset of the plurality of time units are not determined (e.g., assumed) to be bundled. In some cases, the first subset of the plurality of time units and the second subset of the plurality of time units include the same number of consecutive time units. In some cases, the plurality of time units includes a plurality of slots.

The remaining time units component 1340 may determine a number of time units remaining in a frame after receiving the control signal. In some examples, the remaining time units component 1340 may determine multiple sets of time units including the number of time units remaining in the frame, where determining the plurality of time units is based on the multiple sets of time units.

In some examples, the control signal component 1310 may receive, during a third time unit after the first time unit, a second control signal including a second indication of a second reference signal bundling configuration associated with the one or more physical channel types which may be potentially scheduled across a second plurality of time units. In some examples, the time unit determination component 1315 may determine the second plurality of time units based on the second reference signal bundling configuration. In some examples, the bundling component 1330 may determine (e.g., assume) a second bundling associated with the second plurality of time units based on the second reference signal bundling configuration.

The consecutive time units component 1345 may identify, based on the reference signal bundling configuration, a number of consecutive time units directly after the first time unit, where determining the plurality of time units is based on the number of consecutive time units. The offset time units component 1350 may identify a number of offset time units based on the reference signal bundling configuration. In some examples, the consecutive time units component 1345 may identify a number of consecutive time units after the first time unit and the number of offset time units, where determining the plurality of time units is based on the number of consecutive time units. In some examples, the consecutive time units component 1345 may identify, based on the reference signal bundling configuration, a number of consecutive time units after a starting time unit of a frame, where determining the plurality of time units is based on the number of consecutive time units.

The identifier component 1355 may identify, based on the reference signal bundling configuration, an identifier associated with each time unit included in the plurality of time units, where determining the plurality of time units is based on the identifier associated with each time unit. In some examples, the control signal component 1310 may identify a bit included in the control signal, the bit including the indication of the reference signal bundling configuration, where determining the plurality of time units is based on the bit included in the control signal.

The component carrier component 1360 may identify a component carrier identifier based on the reference signal bundling configuration, where the control signal is included in a first component carrier. In some examples, the component carrier component 1360 may determine a second component carrier based on the component carrier identifier, where the plurality of time units is included in the second component carrier.

In some examples, the component carrier component 1360 may determine that the first time unit associated with the first component carrier overlaps with a third time unit associated with the second component carrier, where determining the plurality of time units includes determining that the plurality of time units occurs after the third time unit associated with the second component carrier based on determining that the first time unit associated with the first component carrier overlaps with the third time unit. In some cases, the first component carrier and the second component carrier are associated with different numerologies.

In some examples, the offset time units component 1350 may identify a number of offset time units based on the reference signal bundling configuration. In some examples, the consecutive time units component 1345 may identify a number of consecutive time units after the first time unit and the number of offset time units, where determining the plurality of time units is based on the number of consecutive time units.

The bandwidth part component 1365 may determine that the control signal is included in a first bandwidth part, where determining the plurality of time units includes determining that the plurality of time units is included in a second bandwidth part. In some cases, the first bandwidth part and the second bandwidth part are associated with different numerologies. In some examples, the offset time units component 1350 may identify a number of offset time units based on the reference signal bundling configuration. In some examples, the consecutive time units component 1345 may identify a number of consecutive time units after the first time unit and the number of offset time units, where determining the plurality of time units is based on the number of consecutive time units.

In some examples, the control signal component 1310 may receive, from the one or more base stations during a third time unit after the first time unit, a second control signal, where the control signal is associated with multiple UEs, and where receiving the one or more physical channels is based on the second control signal. The field identification component 1370 may identify that a field of a plurality of fields is included in the control signal, where the field is associated with the UE and includes the reference signal bundling configuration, where determining the plurality of time units is based on identifying the field.

In some examples, the control signal component 1310 may receive, from the one or more base stations during a fourth time unit after the first time unit, a third control signal. In some examples, the physical channel component 1325 may receive a second physical channel during the fourth time unit based on the second control signal. In some examples, the bundling component 1330 may bundle the one or more physical channels and the second physical channel across the two or more of the plurality of time units based on the reference signal bundling configuration. In some cases, the third time unit is separate from the plurality of time units and the fourth time unit is included in the plurality of time units. In some cases, the control signal associated with multiple UEs includes a group common downlink control indicator.

In some examples, the control signal component 1310 may receive, from the one or more base stations during a third time unit after the first time unit, a second control signal. In some examples, the time unit determination component 1315 may determine a second plurality of time units based on the second control signal, where the plurality of time units overlap with the second plurality of time units.

In some examples, the control signal component 1310 may receive, from the one or more base stations, a radio resource control signal indicating a second reference signal bundling configuration associated with a downlink semi-persistent scheduling during a set of time units. In some examples, the reference signal bundling configuration component 1335 may enable the second reference signal bundling configuration across the set of time units based on the second reference signal bundling configuration.

In some cases, a periodicity associated with the downlink semi-persistent scheduling is less than a threshold value. In some cases, the second reference signal bundling configuration includes bundling configuration for reference signals associated with one or more semi-persistent scheduling configurations on a cell. In some cases, the one or more semi-persistent scheduling configurations is based on one or more of a resource block allocation, a rank, or a modulation and coding scheme. In some cases, the second reference signal bundling configuration configures the UE to refrain from bundling a reference signal associated with a semi-persistent scheduling with a reference signal associated with a non-semi-persistent scheduling.

The actions performed by the communications manager 1305 as described herein may be implemented to realize one or more potential advantages. For example, In some implementations, the communications manager 1305 may decrease communication latency and enhance channel throughput and reliability for NR applications. The improvements in the communication link supporting NR applications (for example, decreasing communication latency and increasing data reliability) may further save power and increase battery life at a UE 115 (for example, by reducing complexity and a number of retransmissions).

Figure 14:
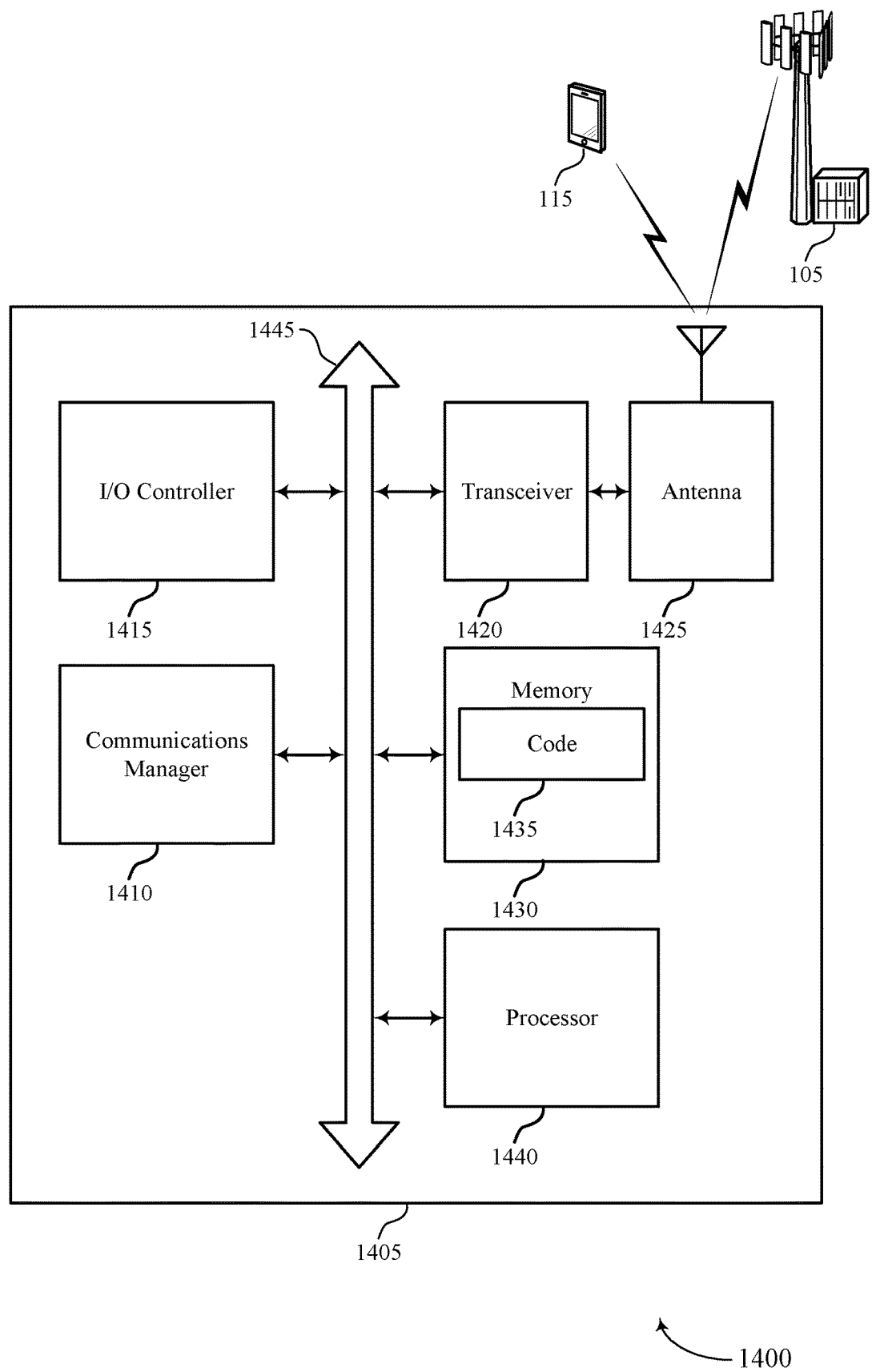
FIG. 14 shows a diagram of a system including a device that supports look-ahead reference signal bundling determination for time-domain reference signal bundling in accordance with aspects of the present disclosure.

FIG. 14 shows a diagram of a system 1400 including a device 1405 that supports look-ahead reference signal bundling determination for time-domain reference signal bundling in accordance with aspects of the present disclosure. The device 1405 may be an example of or include the components of device 1105, device 1205, or a UE 115 as described herein. The device 1405 may include components for bi-directional voice and data communications including components for transmitting and receiving communications, including a communications manager 1410, an I/O controller 1415, a transceiver 1420, an antenna 1425, memory 1430, and a processor 1440. These components may be in electronic communication via one or more buses (e.g., bus 1445).

The communications manager 1410 may receive, from one or more base stations during a first time unit, a control signal including an indication of a reference signal bundling configuration associated with one or more physical channel types which may be potentially scheduled during a plurality of time units after the first time unit. The communications manager 1410 may determine the plurality of time units based on the indication of the reference signal bundling configuration. The communications manager 1410 may receive scheduling configuration of one or more physical channels of the one or more physical channel types. The communications manager 1410 may receive the one or more physical channels during one or more second time units of the plurality of time units, and bundle the one or more physical channels across two or more of the plurality of time units based on the reference signal bundling configuration.

The I/O controller 1415 may manage input and output signals for the device 1405. The I/O controller 1415 may also manage peripherals not integrated into the device 1405. In some cases, the I/O controller 1415 may represent a physical connection or port to an external peripheral. In some cases, the I/O controller 1415 may utilize an operating system such as iOS®, ANDROID®, MS-DOS®, MS-WINDOWS®, OS/2®, UNIX®, LINUX®, or another known operating system. In other cases, the I/O controller 1415 may represent or interact with a modem, a keyboard, a mouse, a touchscreen, or a similar device. In some cases, the I/O controller 1415 may be implemented as part of a processor. In some cases, a user may interact with the device

1405 via the I/O controller 1415 or via hardware components controlled by the I/O controller 1415.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the wireless device may include a single antenna 1425. However, in some cases the device may have more than one antenna 1425, which may be capable of concurrently transmitting or receiving multiple wireless transmissions.

The memory 1430 may include random-access memory (RAM) and read-only memory (ROM). The memory 1430 may store computer-readable, computer-executable code 1435 including instructions that, when executed, cause the processor to perform various functions described herein. In some cases, the memory 1430 may contain, among other things, a basic I/O system (BIOS) which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting look-ahead reference signal bundling determination for time-domain reference signal bundling).

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
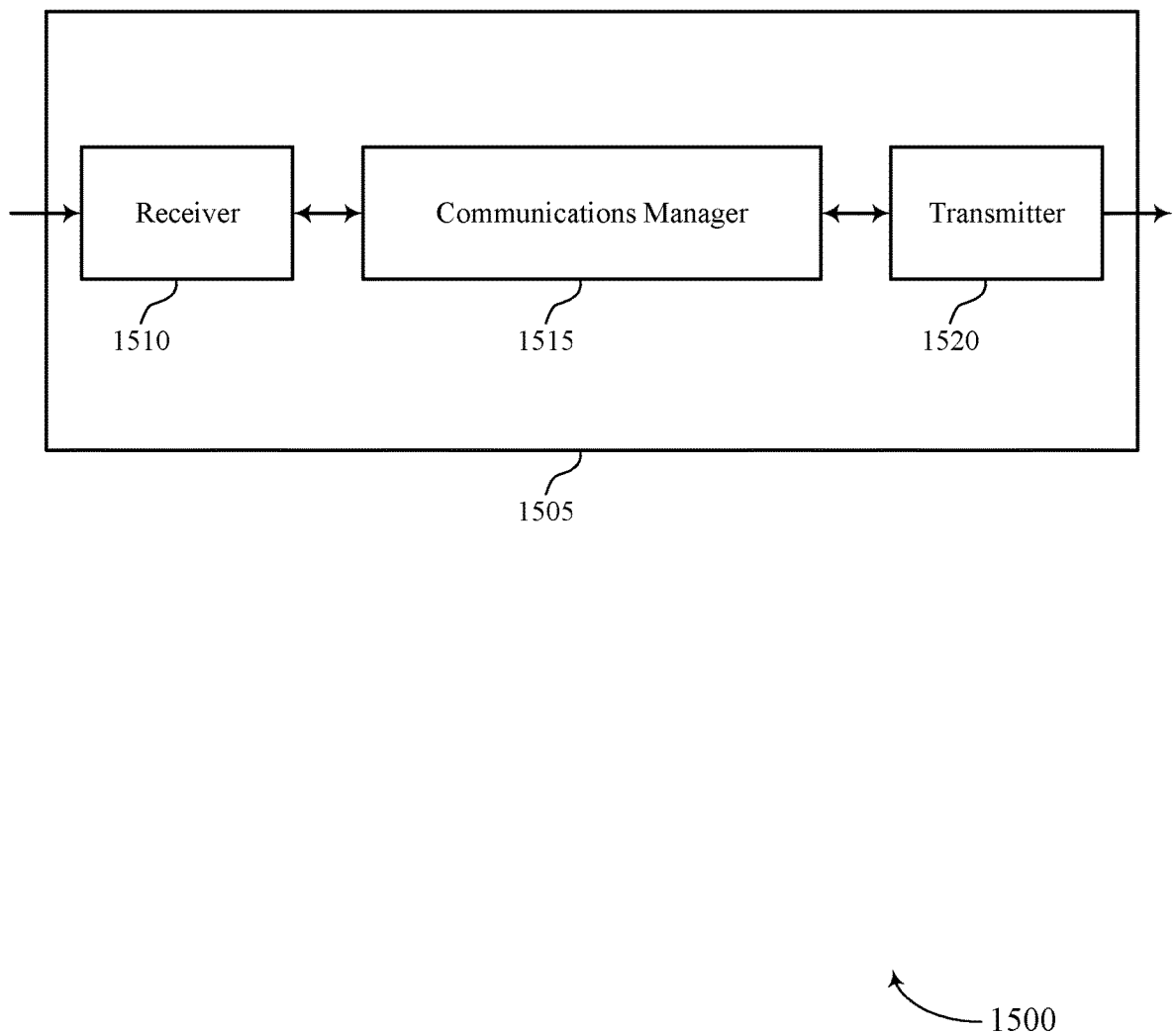
FIGS. 15 and 16 show block diagrams of devices that support look-ahead reference signal bundling determination for time-domain reference signal bundling in accordance with aspects of the present disclosure.

FIG. 15 shows a block diagram 1500 of a device 1505 that supports look-ahead reference signal bundling determination for time-domain reference signal bundling in accordance with aspects of the present disclosure. The device 1505 may be an example of aspects of a base station 105 as described herein. The device 1505 may include a receiver 1510, a communications manager 1515, and a transmitter 1520. The device 1505 may also include a processor. Each of these components may be in communication with one another (e.g., via one or more buses).

The receiver 1510 may receive information such as packets, user data, or control information associated with various information channels (e.g., control channels, data channels, and information related to look-ahead reference signal bundling determination for time-domain reference signal bundling, etc.). Information may be passed on to other components of the device 1505. The receiver 1510 may be an example of aspects of the transceiver 1820 described with reference to FIG. 18. The receiver 1510 may utilize a single antenna or a set of antennas.

The communications manager 1515 may determine a reference signal bundling configuration associated with one or more physical channel types which may be potentially scheduled during a plurality of time units after a first time unit. The communications manager 1515 may transmit, to a UE during the first time unit, a control signal including an indication of the reference signal bundling configuration. The communications manager 1515 may transmit, to the UE, scheduling configuration of one or more physical channels of the one or more physical channel types. The communications manager 1515 may transmit the one or more physical channels during one or more second time units of the plurality of time units, where the one or more physical channels is bundled across two or more of the plurality of time units based on the reference signal bundling configuration. The communications manager 1515 may be an example of aspects of the communications manager 1810 described herein.

The communications manager 1515, or its sub-components, may be implemented in hardware, code (e.g., software or firmware) executed by a processor, or any combination thereof. If implemented in code executed by a processor, the functions of the communications manager 1515, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1515, or its sub-components, may be physically located at various positions, including being distributed such that portions of functions are implemented at different physical locations by one or more physical components. In some examples, the communications manager 1515, or its sub-components, may be a separate and distinct component in accordance with various aspects of the present disclosure. In some examples, the communications manager 1515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1520 may transmit signals generated by other components of the device 1505. In some examples, the transmitter 1520 may be collocated with a receiver 1510 in a transceiver component. For example, the transmitter 1520 may be an example of aspects of the transceiver 1820 described with reference to FIG. 18. The transmitter 1520 may utilize a single antenna or a set of antennas.

Figure 16:
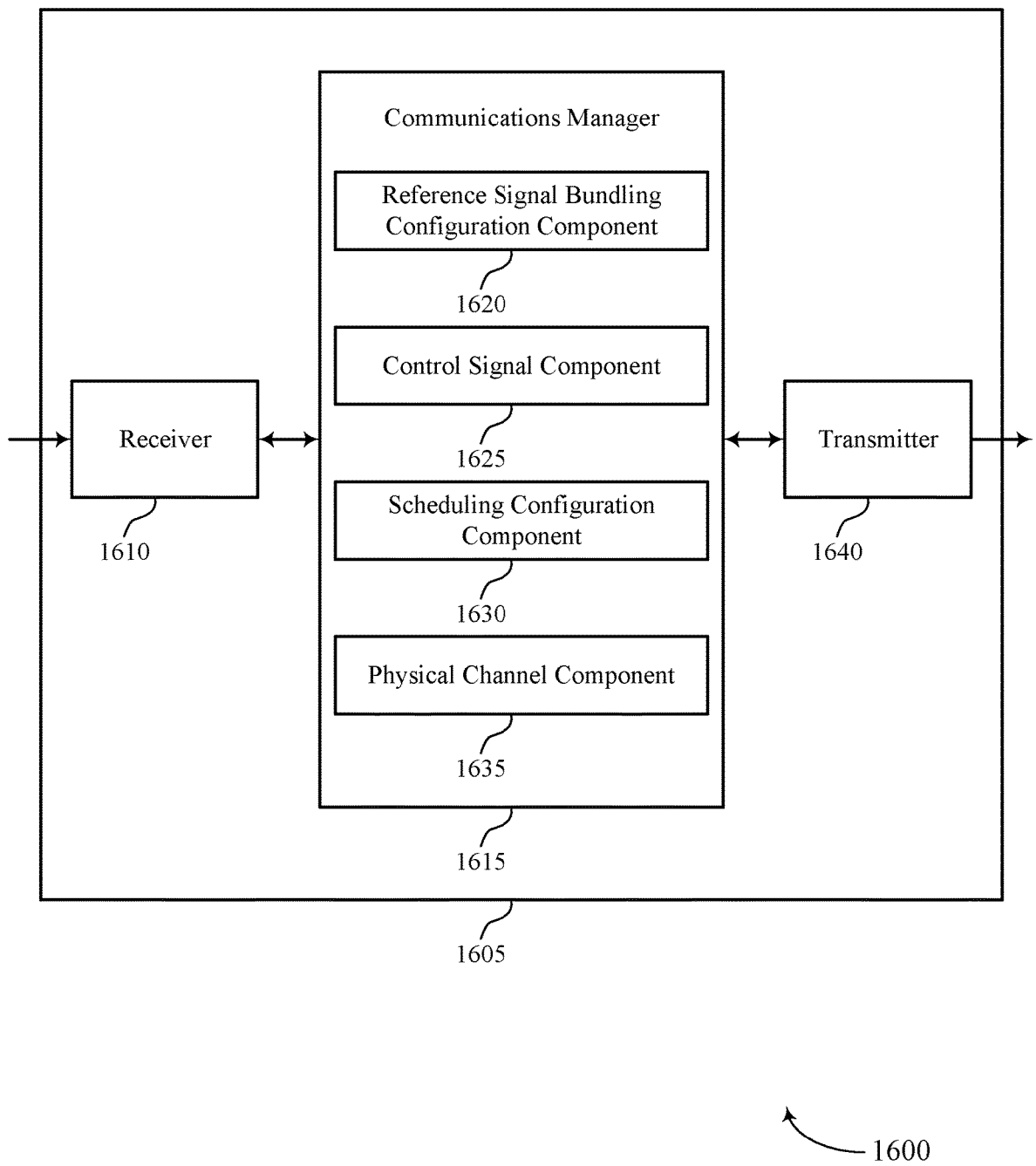

FIG. 16 shows a block diagram 1600 of a device 1605 that supports look-ahead reference signal bundling determination for time-domain reference signal bundling in accordance with aspects of the present disclosure. The device 1605 may be an example of aspects of a device 1505, or a base station 105 as described herein. The device 1605 may include a receiver 1610, a communications manager 1615, and a transmitter 1640. The device 1605 may also include a processor. Each of these components may be in communication with one another (e.g., via one or more buses).

The receiver 1610 may receive information such as packets, user data, or control information associated with various information channels (e.g., control channels, data channels, and information related to look-ahead reference signal bundling determination for time-domain reference signal bundling, etc.). Information may be passed on to other components of the device 1605. The receiver 1610 may be an example of aspects of the transceiver 1820 described with reference to FIG. 18. The receiver 1610 may utilize a single antenna or a set of antennas.

The communications manager 1615 may be an example of aspects of the communications manager 1515 as described herein. The communications manager 1615 may include a reference signal bundling configuration component 1620, a control signal component 1625, a scheduling configuration component 1630, and a physical channel component 1635. The communications manager 1615 may be an example of aspects of the communications manager 1810 described herein.

The reference signal bundling configuration component 1620 may determine a reference signal bundling configuration associated with one or more physical channel types which may be potentially scheduled during a plurality of time units after a first time unit. The control signal component 1625 may transmit, to a UE during the first time unit, a control signal including an indication of the reference signal bundling configuration. The scheduling configuration component 1630 may transmit, to the UE, scheduling configuration of one or more physical channels of the one or more physical channel types. The physical channel component 1635 may transmit the one or more physical channels during one or more second time units of the plurality of time units, where the one or more physical channels is bundled across two or more of the plurality of time units based on the reference signal bundling configuration.

The transmitter 1640 may transmit signals generated by other components of the device 1605. In some examples, the transmitter 1640 may be collocated with a receiver 1610 in a transceiver component. For example, the transmitter 1640 may be an example of aspects of the transceiver 1820 described with reference to FIG. 18. The transmitter 1640 may utilize a single antenna or a set of antennas.

Figure 17:
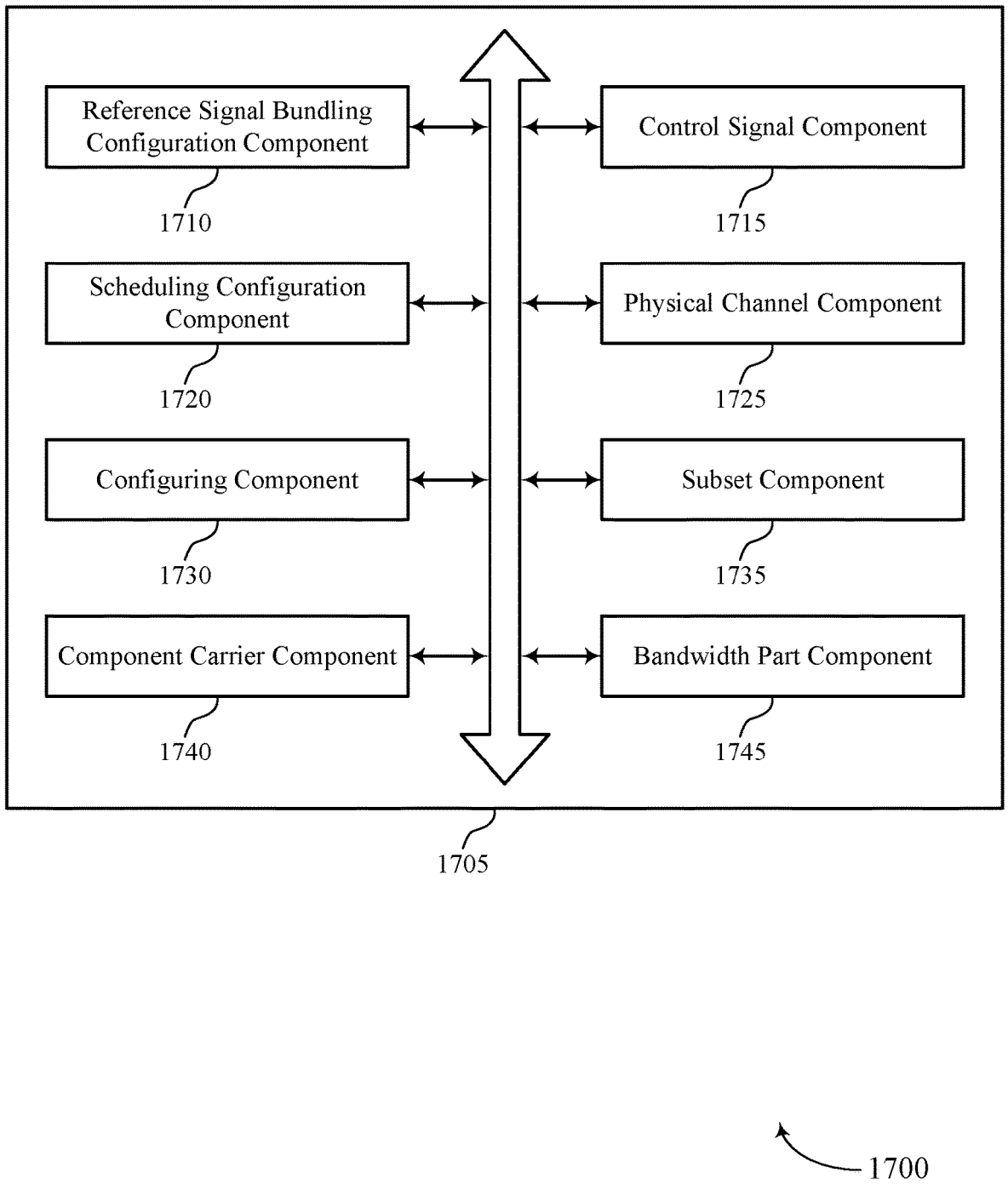
FIG. 17 shows a block diagram of a communications manager that supports look-ahead reference signal bundling determination for time-domain reference signal bundling in accordance with aspects of the present disclosure.

FIG. 17 shows a block diagram 1700 of a communications manager 1705 that supports look-ahead reference signal bundling determination for time-domain reference signal bundling in accordance with aspects of the present disclosure. The communications manager 1705 may be an example of aspects of a communications manager 1515, a communications manager 1615, or a communications manager 1810 described herein. The communications manager 1705 may include a reference signal bundling configuration component 1710, a control signal component 1715, a scheduling configuration component 1720, a physical channel component 1725, a configuring component 1730, a subset component 1735, a component carrier component 1740, and a bandwidth part component 1745. Each of these components may communicate, directly or indirectly, with one another (e.g., via one or more buses).

The reference signal bundling configuration component 1710 may determine a reference signal bundling configuration associated with one or more physical channel types which may be potentially scheduled during a plurality of time units after a first time unit. In some cases, the plurality of time units includes a plurality of slots. The control signal component 1715 may transmit, to a UE during the first time unit, a control signal including an indication of the reference signal bundling configuration.

The scheduling configuration component 1720 may transmit, to the UE, scheduling configuration of one or more physical channels of the one or more physical channel types. The physical channel component 1725 may transmit the one or more physical channels during one or more second time units of the plurality of time units, where the one or more physical channels is bundled across two or more of the plurality of time units based on the reference signal bundling configuration. The configuring component 1730 may configure the UE to determine (e.g., assume) that a precoding has been applied to the one or more physical channels across the two or more of the plurality of time units based on the reference signal bundling configuration.

In some examples, the physical channel component 1725 may transmit a second physical channel during a third time unit of the plurality of time units. In some examples, the configuring component 1730 may configure the UE to determine (e.g., assume) the same precoding scheme has been applied to the second physical channel across the two or more of the plurality of time units based on the reference signal bundling configuration.

In some examples, the control signal component 1715 may transmit, to the UE, a radio resource control signal indicating the reference signal bundling configuration. In some examples, the configuring component 1730 may configure the UE to enable the reference signal bundling configuration across the two or more of the plurality of time units based on the indication in the control signal and the reference signal bundling configuration, where bundling the one or more physical channels across the two or more of the plurality of time units is based on enabling the reference signal bundling configuration.

The subset component 1735 may determine a first subset of the plurality of time units for transmitting the one or more physical channels based on the reference signal bundling configuration. In some examples, the subset component 1735 may determine a second subset of the plurality of time units for transmitting the one or more physical channels. In some examples, the subset component 1735 may determine that the first subset of the plurality of time units and the second subset of the plurality of time units are not determined (e.g., assumed) to be bundled. In some cases, the first subset of the plurality of time units and the second subset of the plurality of time units include the same number of consecutive time units.

In some examples, the control signal component 1715 may transmit, during a third time unit after the first time unit, a second control signal including a second indication of a second reference signal bundling configuration associated with the one or more physical channel types which may be potentially scheduled across a second plurality of time units. In some examples, the reference signal bundling configuration component 1710 may include, in the reference signal bundling configuration, a number of consecutive time units directly after the first time unit, where the plurality of time units is included in the number of consecutive time units. In some examples, the reference signal bundling configuration component 1710 may include, in the reference signal bundling configuration, a number of offset time units, where the plurality of time units is included in a number of consecutive time units after the first time unit and the number of offset time units.

In some examples, the reference signal bundling configuration component 1710 may include, in the reference signal bundling configuration, a number of consecutive time units after a starting time unit of a frame, where the plurality of time units is included in the number of consecutive time units. In some examples, the reference signal bundling configuration component 1710 may include, in the reference signal bundling configuration, an identifier associated with each time unit included in the plurality of time units. In some examples, the control signal component 1715 may include a bit in the control signal, the bit including the indication of the reference signal bundling configuration.

The component carrier component 1740 may identify a component carrier identifier based on the reference signal bundling configuration, where the control signal is included in a first component carrier. In some examples, the component carrier component 1740 may determine a second component carrier based on the component carrier identifier, where the plurality of time units is included in the second component carrier. In some cases, the first component carrier and the second component carrier are associated with different numerologies. The bandwidth part component 1745 may transmit the control signal in a first bandwidth part, where the plurality of time units is included in a second bandwidth part. In some cases, the first bandwidth part and the second bandwidth part are associated with different numerologies.

In some examples, the control signal component 1715 may determine that the control signal is associated with multiple UEs, the multiple UEs including the UE. In some examples, the control signal component 1715 may transmit, to the UE during a third time unit after the first time unit, a second control signal, where transmitting the one or more physical channels is based on the second control signal.

In some examples, the control signal component 1715 may determine a plurality of fields included in the control signal, where each field of the plurality of fields is associated with the UE of the multiple UEs. In some examples, the control signal component 1715 may transmit, to the UE during a fourth time unit after the first time unit, a third control signal. In some examples, the physical channel component 1725 may transmit a second physical channel during the fourth time unit based on the second control signal, where the one or more physical channels and the second physical channel are bundled across the two or more of the plurality of time units based on the reference signal bundling configuration. In some cases, the third time unit is separate from the plurality of time units and the fourth time unit is included in the plurality of time units. In some cases, the control signal associated with multiple UEs includes a group common downlink control indicator.

In some examples, the control signal component 1715 may transmit, to the UE during a third time unit after the first time unit, a second control signal, where the second control signal is associated with a second plurality of time units, and where the plurality of time units overlap with the second plurality of time units. In some examples, the reference signal bundling configuration component 1710 may transmit, to the UE, a radio resource control signal indicating a second reference signal bundling configuration associated with a downlink semi-persistent scheduling during a set of time units. In some examples, the configuring component 1730 may configure the UE to enable the second reference signal bundling configuration across the set of time units based on the second reference signal bundling configuration.

In some cases, a periodicity associated with the downlink semi-persistent scheduling is less than a threshold value. In some cases, the second reference signal bundling configuration includes bundling configuration for reference signals associated with one or more semi-persistent scheduling configurations on a cell. In some cases, the one or more semi-persistent scheduling configurations is based on one or more of a resource block allocation, a rank, or a modulation and coding scheme.

In some cases, the second reference signal bundling configuration configures the UE to refrain from bundling a reference signal associated with a semi-persistent scheduling with a reference signal associated with a non-semi-persistent scheduling. In some cases, the one or more physical channel types include one or more of a physical downlink shared channel, a demodulation reference signal, a cell-specific reference signal, a channel state information reference signal, a physical downlink control channel, or a positioning reference signal. In some cases, the control signal includes a downlink control indicator.

Figure 18:
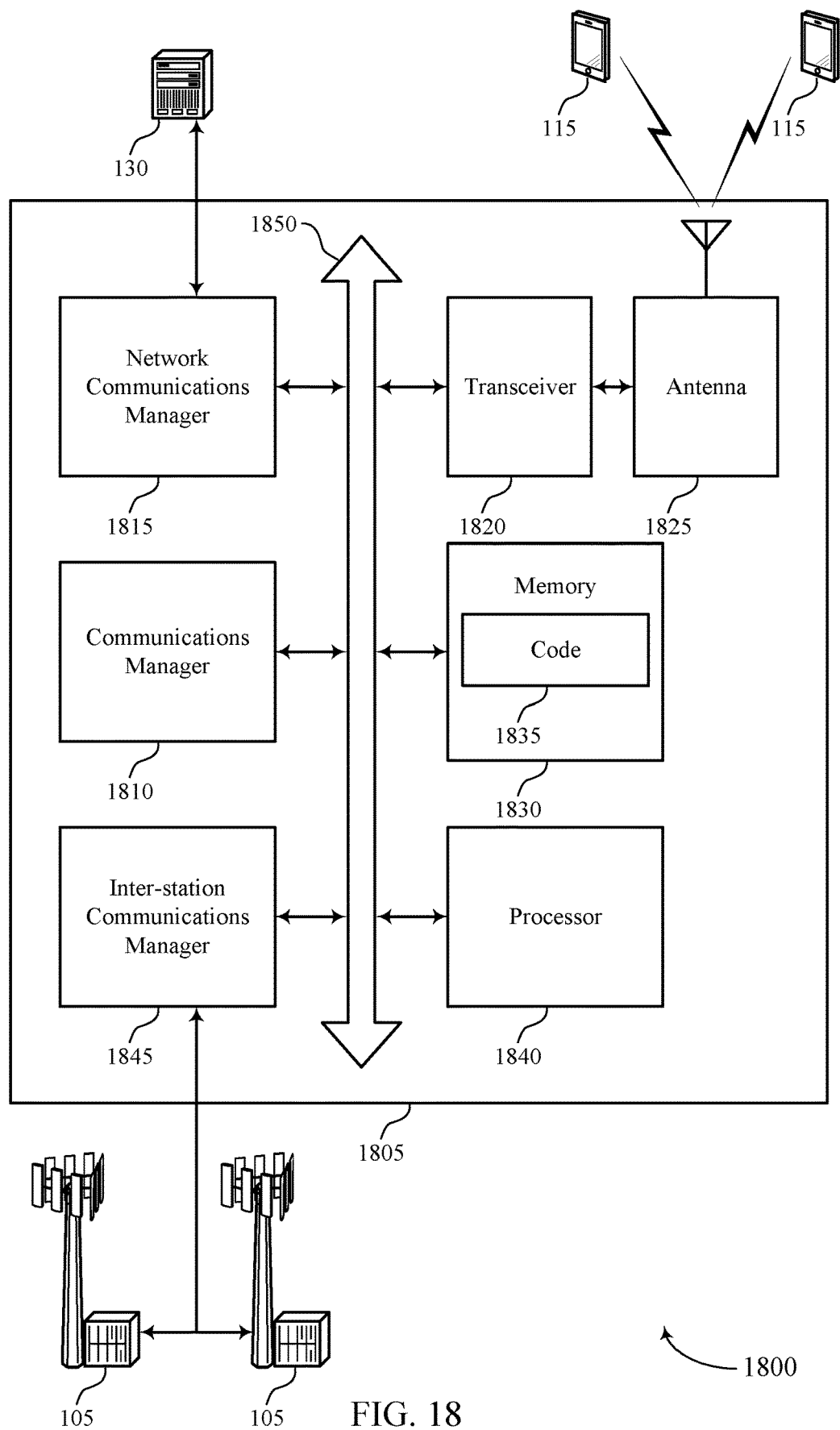
FIG. 18 shows a diagram of a system including a device that supports look-ahead reference signal bundling determination for time-domain reference signal bundling in accordance with aspects of the present disclosure.

FIG. 18 shows a diagram of a system 1800 including a device 1805 that supports look-ahead reference signal bundling determination for time-domain reference signal bundling in accordance with aspects of the present disclosure. The device 1805 may be an example of or include the components of device 1505, device 1605, or a base station 105 as described herein. The device 1805 may include components for bi-directional voice and data communications including components for transmitting and receiving communications, including a communications manager 1810, a network communications manager 1815, a transceiver 1820, an antenna 1825, memory 1830, a processor 1840, and an inter-station communications manager 1845. These components may be in electronic communication via one or more buses (e.g., bus 1850).

The communications manager 1810 may determine a reference signal bundling configuration associated with one or more physical channel types which may be potentially scheduled during a plurality of time units after a first time unit. The communications manager 1810 may transmit, to a UE during the first time unit, a control signal including an indication of the reference signal bundling configuration. The communications manager 1810 may transmit, to the UE, scheduling configuration of one or more physical channels of the one or more physical channel types. The communications manager 1810 may transmit the one or more physical channels during one or more second time units of the plurality of time units, where the one or more physical channels is bundled across two or more of the plurality of time units based on the reference signal bundling configuration.

The network communications manager 1815 may manage communications with the core network (e.g., via one or more wired backhaul links). For example, the network communications manager 1815 may manage the transfer of data communications for client devices, such as one or more UEs 115.

The transceiver 1820 may communicate bi-directionally, via one or more antennas, wired, or wireless links as described herein. For example, the transceiver 1820 may represent a wireless transceiver and may communicate bi-directionally with another wireless transceiver. The transceiver 1820 may also include a modem to modulate the packets and provide the modulated packets to the antennas for transmission, and to demodulate packets received from the antennas. In some cases, the wireless device may include a single antenna 1825. However, in some cases the device may have more than one antenna 1825, which may be capable of concurrently transmitting or receiving multiple wireless transmissions.

The memory 1830 may include RAM, ROM, or a combination thereof. The memory 1830 may store computer-readable code 1835 including instructions that, when executed by a processor (e.g., the processor 1840) cause the device to perform various functions described herein. In some cases, the memory 1830 may contain, among other things, a BIOS which may control basic hardware or software operation such as the interaction with peripheral components or devices.

The processor 1840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some cases, a memory controller may be integrated into processor 1840. The processor 1840 may be configured to execute computer-readable instructions stored in a memory (e.g., the memory 1830) to cause the device 1805 to perform various functions (e.g., functions or tasks supporting look-ahead reference signal bundling determination for time-domain reference signal bundling).

The inter-station communications manager 1845 may manage communications with other base station 105, and may include a controller or scheduler for controlling communications with the UEs 115 in cooperation with other base stations 105. For example, the inter-station communications manager 1845 may coordinate scheduling for transmissions to the UEs 115 for various interference mitigation techniques such as beamforming or joint transmission. In some examples, the inter-station communications manager 1845 may provide an X2 interface within an LTE/LTE-A wireless communication network technology to provide communication between the base stations 105.

The code 1835 may include instructions to implement aspects of the present disclosure, including instructions to support wireless communications. The code 1835 may be stored in a non-transitory computer-readable medium such as system memory or other type of memory. In some cases, the code 1835 may not be directly executable by the processor 1840 but may cause a computer (e.g., when compiled and executed) to perform functions described herein.

Figure 19:
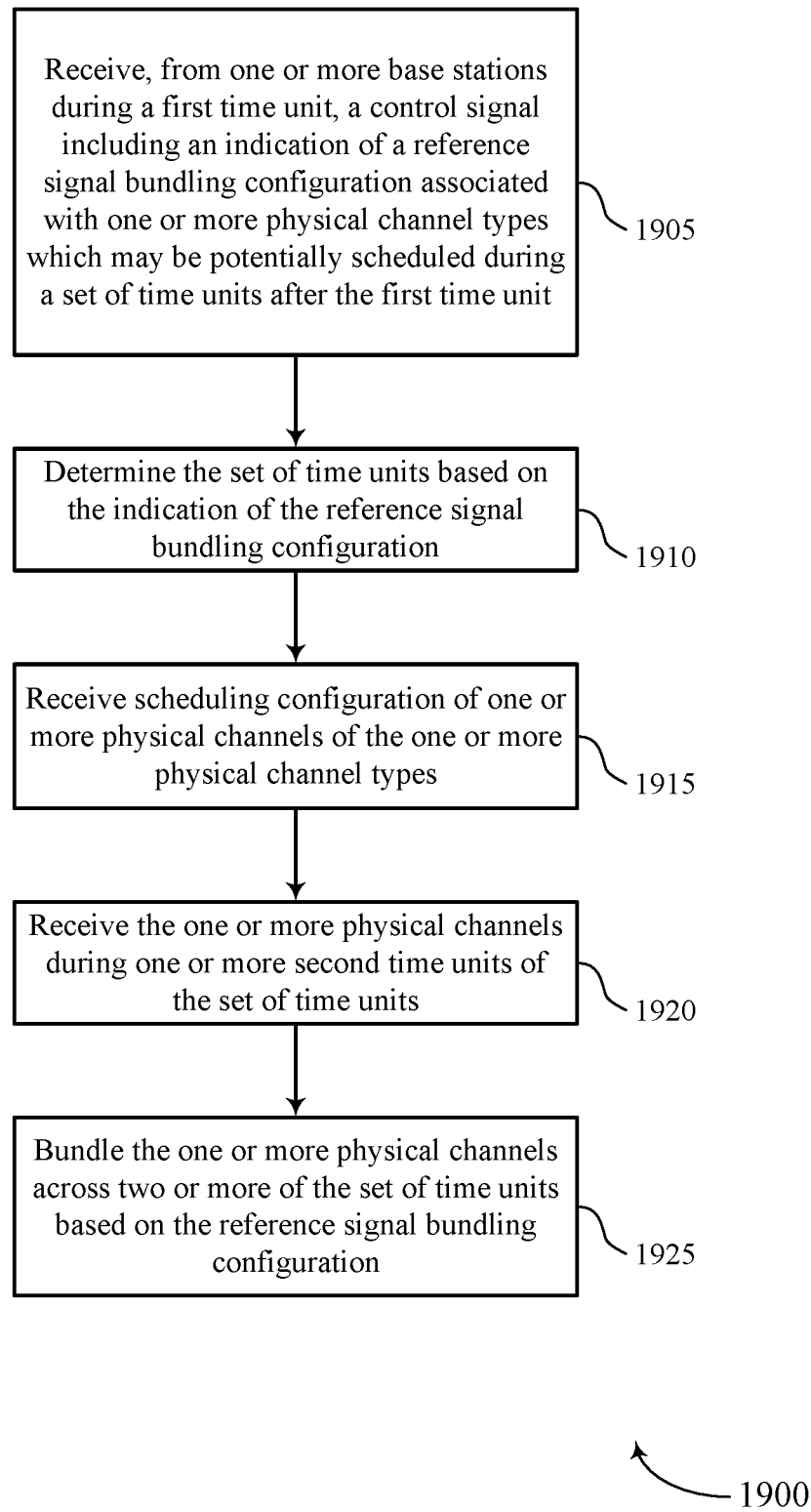
FIGS. 19 through 22 show flowcharts illustrating methods that support look-ahead reference signal bundling determination for time-domain reference signal bundling in accordance with aspects of the present disclosure.

FIG. 19 shows a flowchart illustrating a method 1900 that supports look-ahead reference signal bundling determination for time-domain reference signal bundling in accordance with aspects of the present disclosure. The operations of method 1900 may be implemented by a UE 115 or its components as described herein. For example, the operations of method 1900 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 1905, the UE may receive, from one or more base stations during a first time unit, a control signal including an indication of a reference signal bundling configuration associated with one or more physical channel types which may be potentially scheduled during a plurality of time units after the first time unit. The operations of 1905 may be performed according to the methods described herein. In some examples, aspects of the operations of 1905 may be performed by a control signal component as described with reference to FIGS. 11 through 14.

At 1910, the UE may determine the plurality of time units based on the indication of the reference signal bundling configuration. The operations of 1910 may be performed according to the methods described herein. In some examples, aspects of the operations of 1910 may be performed by a time unit determination component as described with reference to FIGS. 11 through 14.

At 1915, the UE may receive scheduling configuration of one or more physical channels of the one or more physical channel types. The operations of 1915 may be performed according to the methods described herein. In some examples, aspects of the operations of 1915 may be performed by a scheduling configuration component as described with reference to FIGS. 11 through 14.

At 1920, the UE may receive the one or more physical channels during one or more second time units of the plurality of time units. The operations of 1920 may be performed according to the methods described herein. In some examples, aspects of the operations of 1920 may be performed by a physical channel component as described with reference to FIGS. 11 through 14.

At 1925, the UE may bundle the one or more physical channels across two or more of the plurality of time units based on the reference signal bundling configuration. The operations of 1925 may be performed according to the methods described herein. In some examples, aspects of the operations of 1925 may be performed by a bundling component as described with reference to FIGS. 11 through 14.

Figure 20:
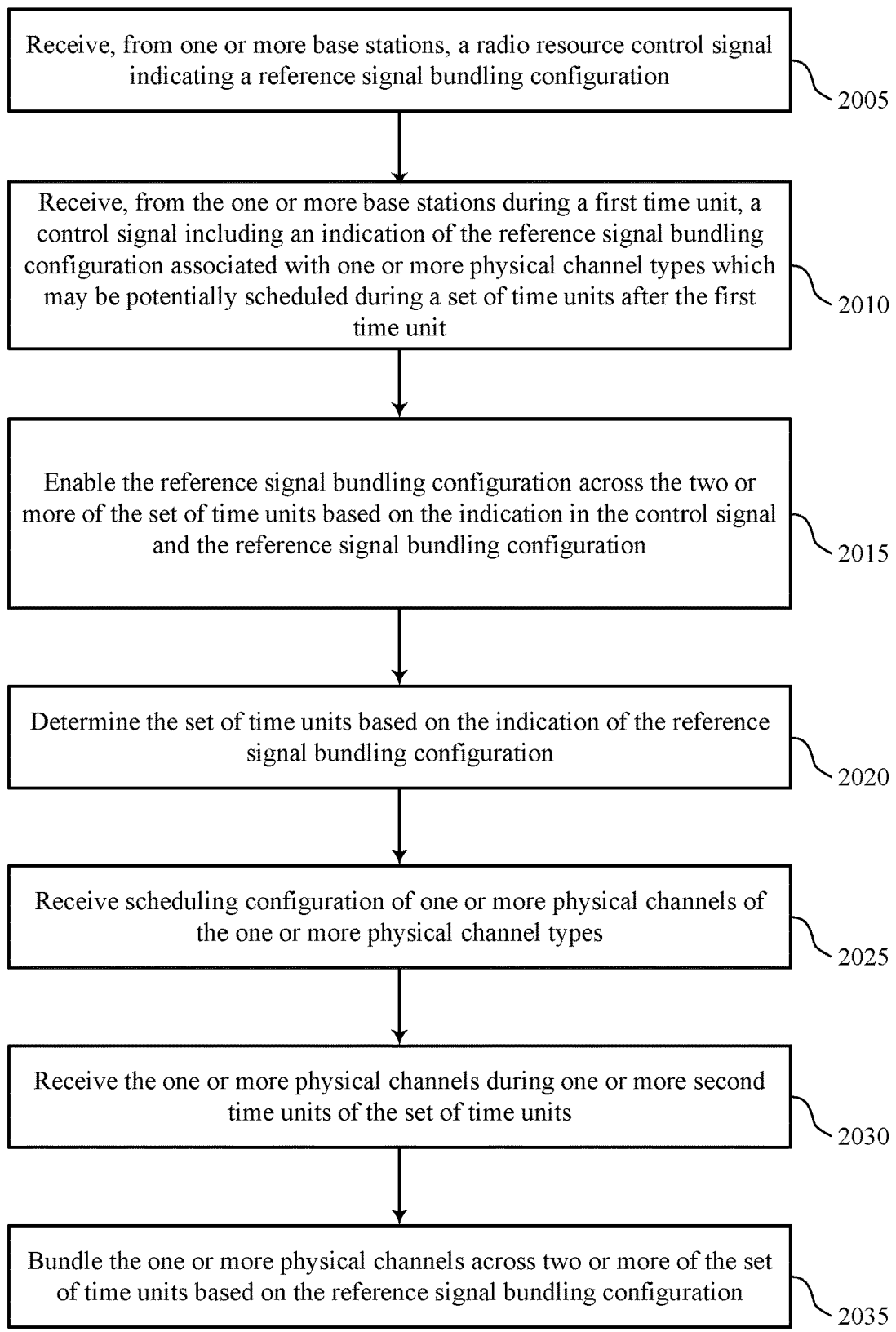

FIG. 20 shows a flowchart illustrating a method 2000 that supports look-ahead reference signal bundling determination for time-domain reference signal bundling in accordance with aspects of the present disclosure. The operations of method 2000 may be implemented by a UE 115 or its components as described herein. For example, the operations of method 2000 may be performed by a communications manager as described with reference to FIGS. 11 through 14. In some examples, a UE may execute a set of instructions to control the functional elements of the UE to perform the functions described herein. Additionally or alternatively, a UE may perform aspects of the functions described herein using special-purpose hardware.

At 2005, the UE may receive, from one or more base stations, a radio resource control signal indicating a reference signal bundling configuration. The operations of 2005 may be performed according to the methods described herein. In some examples, aspects of the operations of 2005 may be performed by a control signal component as described with reference to FIGS. 11 through 14.

At 2010, the UE may receive, from the one or more base stations during a first time unit, a control signal including an indication of the reference signal bundling configuration associated with one or more physical channel types which may be potentially scheduled during a plurality of time units after the first time unit. The operations of 2010 may be performed according to the methods described herein. In some examples, aspects of the operations of 2010 may be performed by a control signal component as described with reference to FIGS. 11 through 14.

At 2015, the UE may enable the reference signal bundling configuration across the two or more of the plurality of time units based on the indication in the control signal and the reference signal bundling configuration. The operations of 2015 may be performed according to the methods described herein. In some examples, aspects of the operations of 2015 may be performed by a reference signal bundling configuration component as described with reference to FIGS. 11 through 14.

At 2020, the UE may determine the plurality of time units based on the indication of the reference signal bundling configuration. The operations of 2020 may be performed according to the methods described herein. In some examples, aspects of the operations of 2020 may be performed by a time unit determination component as described with reference to FIGS. 11 through 14.

At 2025, the UE may receive scheduling configuration of one or more physical channels of the one or more physical channel types. The operations of 2025 may be performed according to the methods described herein. In some examples, aspects of the operations of 2025 may be performed by a scheduling configuration component as described with reference to FIGS. 11 through 14.

At 2030, the UE may receive the one or more physical channels during one or more second time units of the plurality of time units. The operations of 2030 may be performed according to the methods described herein. In some examples, aspects of the operations of 2030 may be performed by a physical channel component as described with reference to FIGS. 11 through 14.

At 2035, the UE may bundle the one or more physical channels across two or more of the plurality of time units based on the reference signal bundling configuration. The operations of 2035 may be performed according to the methods described herein. In some examples, aspects of the operations of 2035 may be performed by a bundling component as described with reference to FIGS. 11 through 14.

Figure 21:
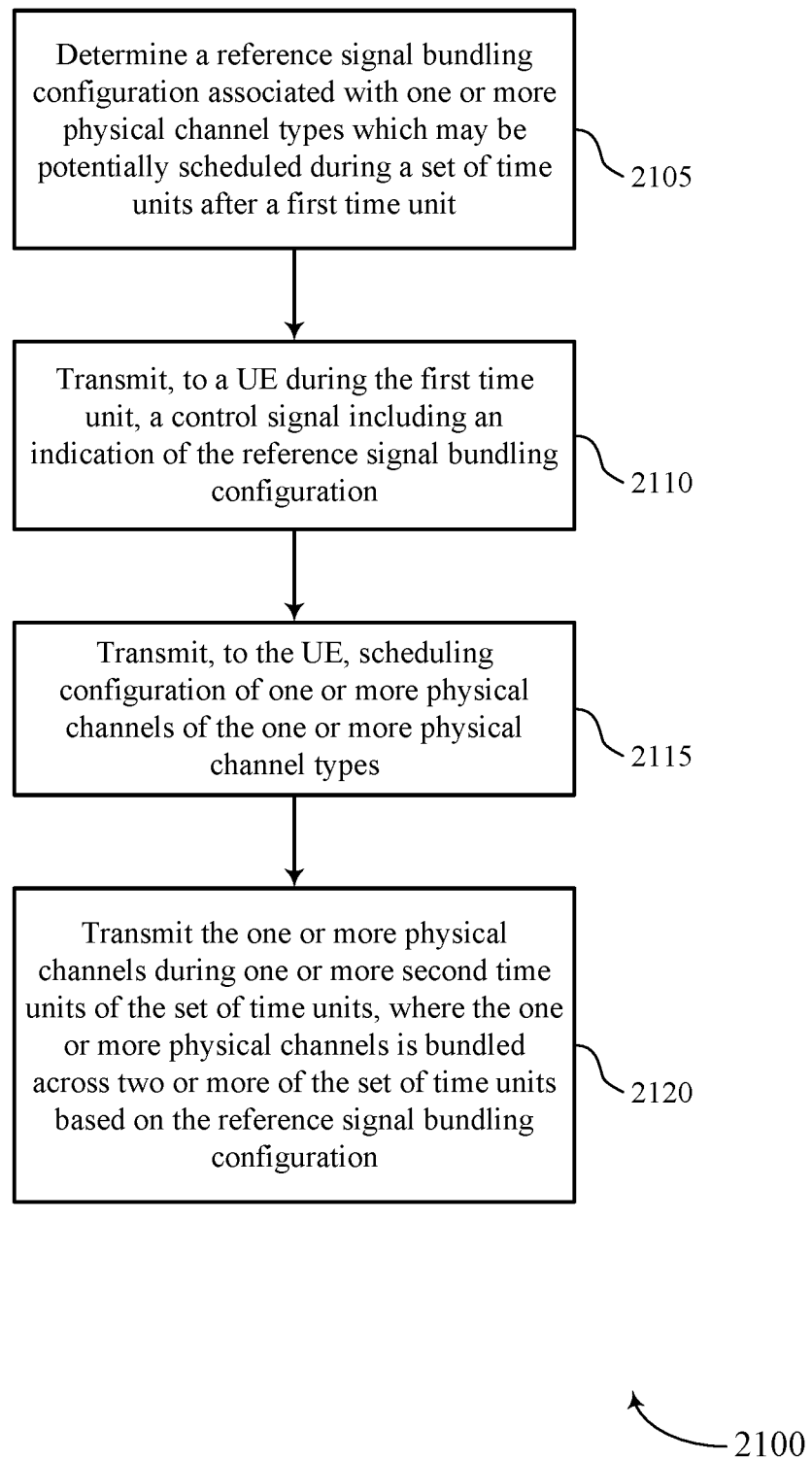

FIG. 21 shows a flowchart illustrating a method 2100 that supports look-ahead reference signal bundling determination for time-domain reference signal bundling in accordance with aspects of the present disclosure. The operations of method 2100 may be implemented by a base station 105 or its components as described herein. For example, the operations of method 2100 may be performed by a communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2105, the base station may determine a reference signal bundling configuration associated with one or more physical channel types which may be potentially scheduled during a plurality of time units after a first time unit. The operations of 2105 may be performed according to the methods described herein. In some examples, aspects of the operations of 2105 may be performed by a reference signal bundling configuration component as described with reference to FIGS. 15 through 18.

At 2110, the base station may transmit, to a UE during the first time unit, a control signal including an indication of the reference signal bundling configuration. The operations of 2110 may be performed according to the methods described herein. In some examples, aspects of the operations of 2110 may be performed by a control signal component as described with reference to FIGS. 15 through 18.

At 2115, the base station may transmit, to the UE, scheduling configuration of one or more physical channels of the one or more physical channel types. The operations of 2115 may be performed according to the methods described herein. In some examples, aspects of the operations of 2115 may be performed by a scheduling configuration component as described with reference to FIGS. 15 through 18.

At 2120, the base station may transmit the one or more physical channels during one or more second time units of the plurality of time units, where the one or more physical channels is bundled across two or more of the plurality of time units based on the reference signal bundling configuration. The operations of 2120 may be performed according to the methods described herein. In some examples, aspects of the operations of 2120 may be performed by a physical channel component as described with reference to FIGS. 15 through 18.

Figure 22:
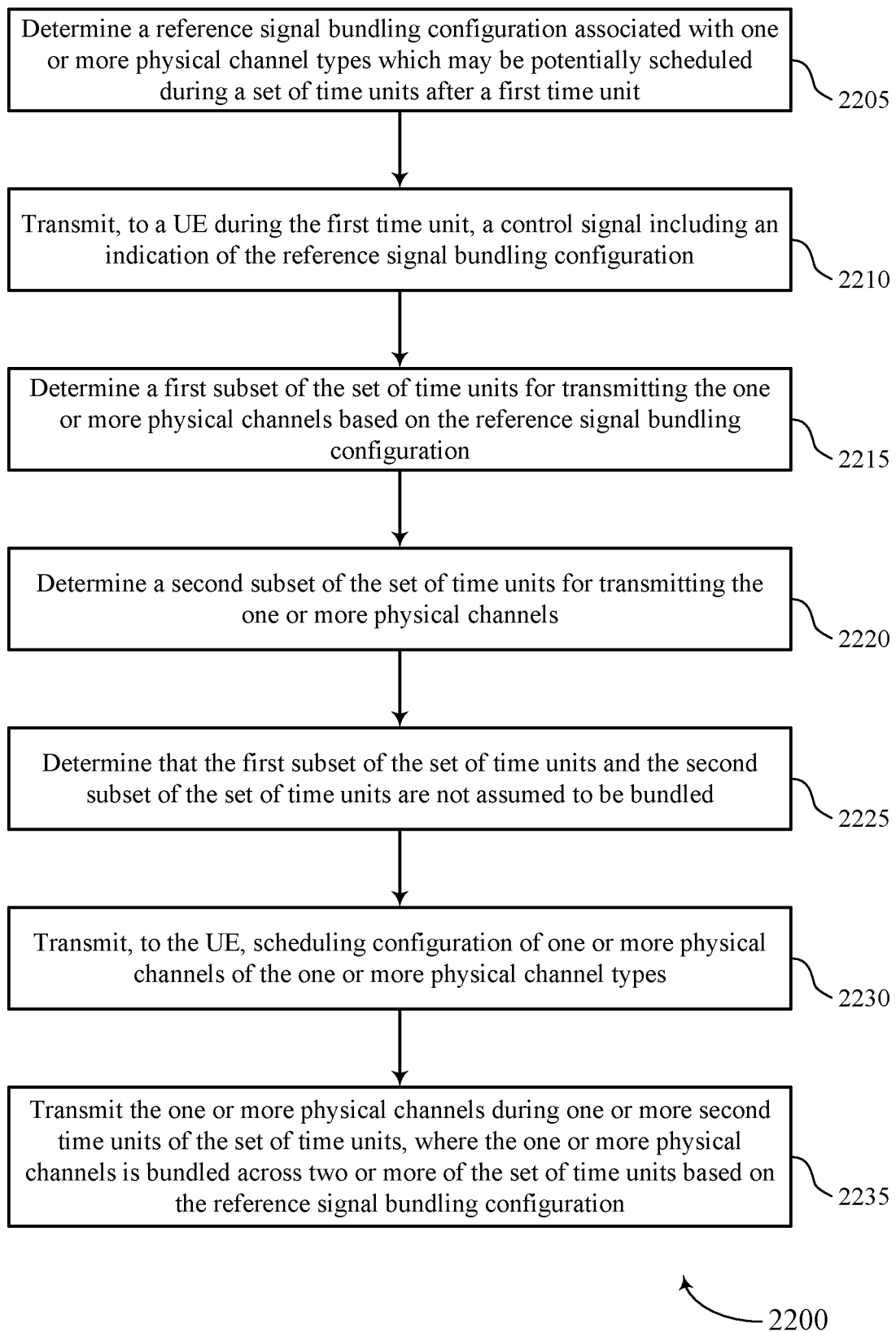

FIG. 22 shows a flowchart illustrating a method 2200 that supports look-ahead reference signal bundling determination for time-domain reference signal bundling in accordance with aspects of the present disclosure. The operations of method 2200 may be implemented by a base station 105 or its components as described herein. For example, the operations of method 2200 may be performed by a communications manager as described with reference to FIGS. 15 through 18. In some examples, a base station may execute a set of instructions to control the functional elements of the base station to perform the functions described herein. Additionally or alternatively, a base station may perform aspects of the functions described herein using special-purpose hardware.

At 2205, the base station may determine a reference signal bundling configuration associated with one or more physical channel types which may be potentially scheduled during a plurality of time units after a first time unit. The operations of 2205 may be performed according to the methods described herein. In some examples, aspects of the operations of 2205 may be performed by a reference signal bundling configuration component as described with reference to FIGS. 15 through 18.

At 2210, the base station may transmit, to a UE during the first time unit, a control signal including an indication of the reference signal bundling configuration. The operations of 2210 may be performed according to the methods described herein. In some examples, aspects of the operations of 2210 may be performed by a control signal component as described with reference to FIGS. 15 through 18.

At 2215, the base station may determine a first subset of the plurality of time units for transmitting the one or more physical channels based on the reference signal bundling configuration. The operations of 2215 may be performed according to the methods described herein. In some examples, aspects of the operations of 2215 may be performed by a subset component as described with reference to FIGS. 15 through 18.

At 2220, the base station may determine a second subset of the plurality of time units for transmitting the one or more physical channels. The operations of 2220 may be performed according to the methods described herein. In some examples, aspects of the operations of 2220 may be performed by a subset component as described with reference to FIGS. 15 through 18.

At 2225, the base station may determine that the first subset of the plurality of time units and the second subset of the plurality of time units are not determined (e.g., assumed) to be bundled. The operations of 2225 may be performed according to the methods described herein. In some examples, aspects of the operations of 2225 may be performed by a subset component as described with reference to FIGS. 15 through 18.

At 2230, the base station may transmit, to the UE, scheduling configuration of one or more physical channels of the one or more physical channel types. The operations of 2230 may be performed according to the methods described herein. In some examples, aspects of the operations of 2230 may be performed by a scheduling configuration component as described with reference to FIGS. 15 through 18.

At 2235, the base station may transmit the one or more physical channels during one or more second time units of the plurality of time units, where the one or more physical channels is bundled across two or more of the plurality of time units based on the reference signal bundling configuration. The operations of 2235 may be performed according to the methods described herein. In some examples, aspects of the operations of 2235 may be performed by a physical channel component as described with reference to FIGS. 15 through 18.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile (GSM) Communications.

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by the UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by the UEs with service subscriptions with the network provider. A femto cell may also cover a small geographic area (e.g., a home) and may provide restricted access by the UEs having an association with the femto cell (e.g., the UEs in a closed subscriber group (CSG), the UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some examples, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
   receiving, from one or more base stations during a first time unit, a first control signal comprising an indication of a reference signal bundling configuration associated with one or more physical channel types which will be potentially scheduled during a plurality of time units after the first time unit;
   determining the plurality of time units based at least in part on the indication of the reference signal bundling configuration;
   receiving scheduling configuration of one or more physical channels of the one or more physical channel types;
   receiving, from the one or more base stations during a second time unit after the first time unit, a second control signal, wherein the first control signal is associated with multiple user equipments;
   receiving the one or more physical channels during one or more third time units of the plurality of time units based at least in part on receiving the first control signal, the second control signal, or both; and
   bundling the one or more physical channels across two or more of the plurality of time units based at least in part on the reference signal bundling configuration.

2. The method of claim 1, wherein bundling the one or more physical channels further comprises:
   assuming that a same precoding is applied to the one or more physical channels across the two or more of the plurality of time units based at least in part on the reference signal bundling configuration.

3. The method of claim 2, further comprising:
   receiving a second physical channel during a fourth time unit of the plurality of time units; and
   assuming that the same precoding is applied to the second physical channel across the two or more of the plurality of time units based at least in part on the reference signal bundling configuration.

4. The method of claim 1, further comprising:
   receiving, from the one or more base stations, a radio resource control signal indicating the reference signal bundling configuration; and
   enabling the reference signal bundling configuration across the two or more of the plurality of time units based at least in part on the indication in the first control signal and the reference signal bundling configuration, wherein bundling the one or more physical channels across the two or more of the plurality of time units is based at least in part on enabling the reference signal bundling configuration.

5. The method of claim 1, wherein determining the plurality of time units further comprises:
   determining a first subset of the plurality of time units for receiving the one or more physical channel types based at least in part on the reference signal bundling configuration;
   determining a second subset of the plurality of time units for receiving the one or more physical channel types; and
   determining that the first subset of the plurality of time units and the second subset of the plurality of time units are not assumed to be bundled.

6. The method of claim 5, wherein the first subset of the plurality of time units and the second subset of the plurality of time units comprise a same number of consecutive time units.

7. The method of claim 1, further comprising:
   determining a number of time units remaining in a frame after receiving the first control signal; and
   determining multiple sets of time units comprising the number of time units remaining in the frame, wherein determining the plurality of time units is based at least in part on the multiple sets of time units.

8. The method of claim 1, further comprising:
   receiving, during a fourth time unit after the first time unit, a third control signal comprising a second indication of a second reference signal bundling configuration associated with the one or more physical channel types which will be potentially scheduled across a second plurality of time units;
   determining the second plurality of time units based at least in part on the second reference signal bundling configuration; and assuming a second bundling associated with the second plurality of time units based at least in part on the second reference signal bundling configuration.

9. The method of claim 1, further comprising:
identifying, based at least in part on the reference signal bundling configuration, a number of consecutive time units directly after the first time unit, wherein determining the plurality of time units is based at least in part on the number of consecutive time units.

10. The method of claim 1, further comprising:
identifying a number of offset time units based at least in part on the reference signal bundling configuration; and
identifying a number of consecutive time units after the first time unit and the number of offset time units, wherein determining the plurality of time units is based at least in part on the number of consecutive time units.

11. The method of claim 1, further comprising:
identifying, based at least in part on the reference signal bundling configuration, a number of consecutive time units after a starting time unit of a frame, wherein determining the plurality of time units is based at least in part on the number of consecutive time units.

12. The method of claim 1, further comprising:
identifying, based at least in part on the reference signal bundling configuration, an identifier associated with each time unit included in the plurality of time units, wherein determining the plurality of time units is based at least in part on the identifier associated with each time unit.

13. The method of claim 1, further comprising:
identifying a bit included in the first control signal, the bit comprising the indication of the reference signal bundling configuration, wherein determining the plurality of time units is based at least in part on the bit included in the first control signal.

14. The method of claim 1, further comprising:
identifying a component carrier identifier based at least in part on the reference signal bundling configuration, wherein the first control signal is included in a first component carrier; and
determining a second component carrier based at least in part on the component carrier identifier, wherein the plurality of time units is included in the second component carrier.

15. The method of claim 14, further comprising:
determining that the first time unit associated with the first component carrier overlaps with a fourth time unit associated with the second component carrier, wherein determining the plurality of time units comprises determining that the plurality of time units occurs after the fourth time unit associated with the second component carrier based at least in part on determining that the first time unit associated with the first component carrier overlaps with the fourth time unit.

16. The method of claim 14, further comprising:
identifying a number of offset time units based at least in part on the reference signal bundling configuration; and
identifying a number of consecutive time units after the first time unit and the number of offset time units, wherein determining the plurality of time units is based at least in part on the number of consecutive time units.

17. The method of claim 14, wherein the first component carrier and the second component carrier are associated with different numerologies.

18. The method of claim 1, further comprising:
determining that the first control signal is included in a first bandwidth part, wherein determining the plurality of time units comprises determining that the plurality of time units is included in a second bandwidth part, wherein the first bandwidth part and the second bandwidth part are associated with different numerologies.

19. The method of claim 18, further comprising:
identifying a number of offset time units based at least in part on the reference signal bundling configuration; and
identifying a number of consecutive time units after the first time unit and the number of offset time units, wherein determining the plurality of time units is based at least in part on the number of consecutive time units.

20. The method of claim 1, further comprising:
identifying that a field of a plurality of fields is included in the first control signal, wherein the field is associated with the user equipment and includes the reference signal bundling configuration, wherein determining the plurality of time units is based at least in part on identifying the field.

21. The method of claim 1, further comprising:
receiving, from the one or more base stations during a fourth time unit after the first time unit, a third control signal, wherein the second time unit is separate from the plurality of time units and the fourth time unit is included in the plurality of time units;
receiving a second physical channel during the fourth time unit based at least in part on the second control signal; and
bundling the one or more physical channels and the second physical channel across the two or more of the plurality of time units based at least in part on the reference signal bundling configuration.

22. The method of claim 1, further comprising:
receiving, from the one or more base stations during a fourth time unit after the first time unit, a third control signal; and
determining a second plurality of time units based at least in part on the third control signal, wherein the plurality of time units overlap with the second plurality of time units.

23. The method of claim 1, further comprising:
receiving, from the one or more base stations, a radio resource control signal indicating a second reference signal bundling configuration associated with a downlink semi-persistent scheduling during a set of time units, wherein a periodicity associated with the downlink semi-persistent scheduling is less than a threshold value; and
enabling the second reference signal bundling configuration across the set of time units based at least in part on the second reference signal bundling configuration.

24. The method of claim 23, wherein the second reference signal bundling configuration comprises bundling configuration for reference signals associated with one or more semi-persistent scheduling configurations on a cell, and wherein the one or more semi-persistent scheduling configurations is based at least in part on one or more of a resource block allocation, a rank, or a modulation and coding scheme.

25. The method of claim 23, wherein the second reference signal bundling configuration configures the user equipment to refrain from bundling a reference signal associated with a semi-persistent scheduling with a reference signal associated with a non-semi-persistent scheduling.

26. An apparatus for wireless communication at a user equipment, comprising:
a processor,
memory coupled with the processor; and instructions stored in the memory and executable by the processor to cause the apparatus to:

receive, from one or more base stations during a first time unit, a first control signal comprising an indication of a reference signal bundling configuration associated with one or more physical channel types which will be potentially scheduled during a plurality of time units after the first time unit;

determine the plurality of time units based at least in part on the indication of the reference signal bundling configuration;

receive scheduling configuration of one or more physical channels of the one or more physical channel types;

receive, from the one or more base stations during a second time unit after the first time unit, a second control signal, wherein the first control signal is associated with multiple user equipments;

receive the one or more physical channels during one or more third time units of the plurality of time units based at least in part on receiving the first control signal, the second control signal, or both; and bundle the one or more physical channels across two or more of the plurality of time units based at least in part on the reference signal bundling configuration.

27. The apparatus of claim 26, wherein the instructions to bundle the one or more physical channels further are executable by the processor to cause the apparatus to:

assume that a same precoding is applied to the one or more physical channels across the two or more of the plurality of time units based at least in part on the reference signal bundling configuration.

28. An apparatus for wireless communication at a user equipment, comprising:

means for receiving, from one or more base stations during a first time unit, a first control signal comprising an indication of a reference signal bundling configuration associated with one or more physical channel types which will be potentially scheduled during a plurality of time units after the first time unit;

means for determining the plurality of time units based at least in part on the indication of the reference signal bundling configuration;

means for receiving scheduling configuration of one or more physical channels of the one or more physical channel types;

means for receiving, from the one or more base stations during a second time unit after the first time unit, a second control signal, wherein the first control signal is associated with multiple user equipments;

means for receiving the one or more physical channels during one or more third time units of the plurality of time units based at least in part on receiving the first control signal, the second control signal, or both; and means for bundling the one or more physical channels across two or more of the plurality of time units based at least in part on the reference signal bundling configuration.

29. A non-transitory computer-readable medium storing code for wireless communication at a user equipment, the code comprising instructions executable by a processor to:

receive, from one or more base stations during a first time unit, a first control signal comprising an indication of a reference signal bundling configuration associated with one or more physical channel types which will be potentially scheduled during a plurality of time units after the first time unit;

determine the plurality of time units based at least in part on the indication of the reference signal bundling configuration;

receive scheduling configuration of one or more physical channels of the one or more physical channel types;

receive from the one or more base stations during a second time unit after the first time unit, a second control signal, wherein the first control signal is associated with multiple user equipments;

receive the one or more physical channels during one or more third time units of the plurality of time units based at least in part on receiving the first control signal, the second control signal, or both; and bundle the one or more physical channels across two or more of the plurality of time units based at least in part on the reference signal bundling configuration.

\* \* \* \* \*